US007518711B2

(12) United States Patent
Futami et al.

(10) Patent No.: US 7,518,711 B2

(45) Date of Patent: Apr. 14, 2009

(54) OPTICAL WAVEFORM MEASUREMENT APPARATUS AND OPTICAL WAVEFORM MEASUREMENT METHOD

(75) Inventors: Fumio Futami, Kawasaki (JP); Shigeki Watanabe, Kawasaki (JP); Shunsuke Ono, Kawasaki (JP); Ryou Okabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 357 days.

(21) Appl. No.: 11/477,538

(22) Filed: Jun. 30, 2006

(65) Prior Publication Data

US 2007/0211252 A1 Sep. 13, 2007

(30) Foreign Application Priority Data

Mar. 9, 2006 (JP) ............................ 2006-064798

(51) Int. Cl.
*G01N 21/00* (2006.01)

(52) U.S. Cl. ..................................... 356/73.1; 356/121

(58) Field of Classification Search ................ 356/73.1, 356/121–127; 398/158, 152, 184, 195, 200, 398/206, 109; 385/122, 11, 16
See application file for complete search history.

(56) References Cited

U.S. PATENT DOCUMENTS

| | | | | |
|---|---|---|---|---|
| 5,798,853 | A | 8/1998 | Watanabe | |
| 6,307,984 | B1 | 10/2001 | Watanabe | |
| 6,504,972 | B2 | 1/2003 | Watanabe | |
| 6,771,853 | B2 | 8/2004 | Watanabe | |
| 6,870,974 | B2 | 3/2005 | Watanabe | |
| 6,980,290 | B2 * | 12/2005 | Ohta et al. | 356/121 |
| 7,068,360 | B2 * | 6/2006 | Ohta | 356/124.5 |
| 2001/0053263 | A1 | 12/2001 | Watanabe | |
| 2003/0035618 | A1 | 2/2003 | Watanabe | |
| 2003/0043366 | A1 | 3/2003 | Ohta et al. | |
| 2004/0081470 | A1 | 4/2004 | Griffin | |

(Continued)

FOREIGN PATENT DOCUMENTS

EP 862078 A1 9/1998

(Continued)

OTHER PUBLICATIONS

S. Watanabe et al.; Novel Fiber Kerr-Switch with Parametric Gain: Demonstration of Optical Demultiplexing and Sampling up to 640 Gb/S; Proceedings of the European Conference on Optical Communication, 2004, pp. 12-13, XP009064236.

(Continued)

*Primary Examiner*—L. G Lauchman
(74) *Attorney, Agent, or Firm*—Staas & Halsey LLP

(57) ABSTRACT

A first polarization controller controls a polarization state of measured light. A second polarization controller controls a polarization state of an optical sampling pulse. The measured light and the optical sampling pulse having the polarization states controlled are input to an optical fiber. An optical signal output from the optical fiber is transmitted to a polarizer. A first control unit adjusts the first polarization controller based on the measured light output from the optical fiber and the measured light output from the polarizer. A second control unit adjusts the second polarization controller based on an optical sampling pulse output from the optical fiber. Waveform measurement is performed by using the output of the polarizer.

16 Claims, 22 Drawing Sheets

U.S. PATENT DOCUMENTS

| | | | | |
|---|---|---|---|---|
| 2004/0184698 | A1 | 9/2004 | Watanabe | |
| 2006/0159463 | A1 * | 7/2006 | Futami et al. ............... | 398/152 |

FOREIGN PATENT DOCUMENTS

| | | |
|---|---|---|
| EP | 0903567 | 3/1999 |
| EP | 1241458 | 9/2002 |
| EP | 1633066 | 3/2006 |
| JP | A-07-98464 | 4/1995 |
| JP | A-11-220443 | 8/1999 |
| JP | A-2003-65857 | 3/2003 |
| WO | WO98/08138 | 2/1998 |

OTHER PUBLICATIONS

European Search Report; dated Jun. 4, 2007; Application No.: 06013475.6—2415.

S. Watanabe, et al., “Ultrafast All-Optical 3R-Regeneration,” *IEICE Transactions on Electronics*, vol. E87-C, No. 7, Jul. 2004.

N. Yamada, et al., “Polarization-Insensitive Optical Sampling System Using Two KTP Crystals,” *IEEE Photonics Technology Letters*, vol. 16, No. 1, Jan. 2004.

G. P. Agrawal, “Nonlinear Fiber Optics,” *Academic Press, Inc*., 1989.

S. Watanabe, et al., “Novel Fiber Kerr-Switch with Parametric Gain: Demonstration of Optical Demultiplexing and Sampling Up to 640 Gb/s,” *ECOC 2004 Proceeding*., Post-deadline Paper Th4.1.6, Sep. 5, 204.

* cited by examiner

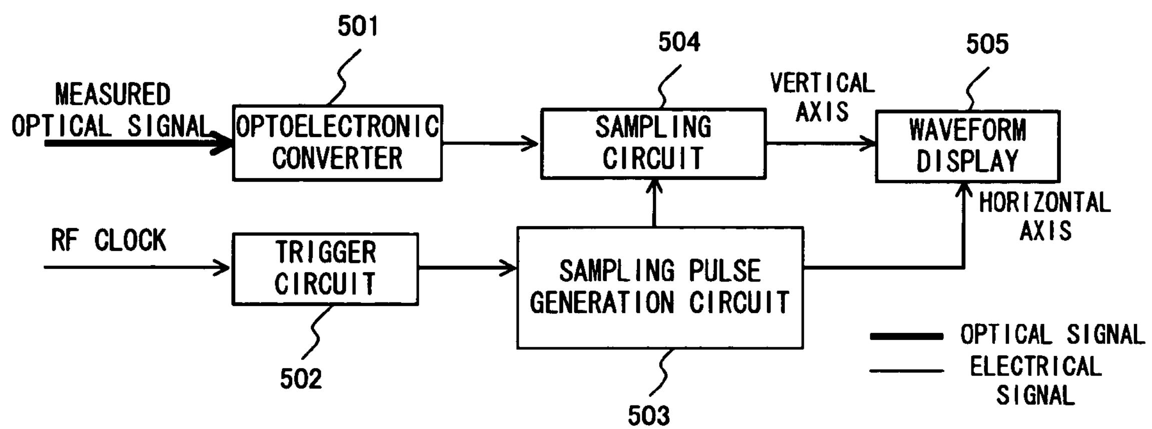
F I G. 1

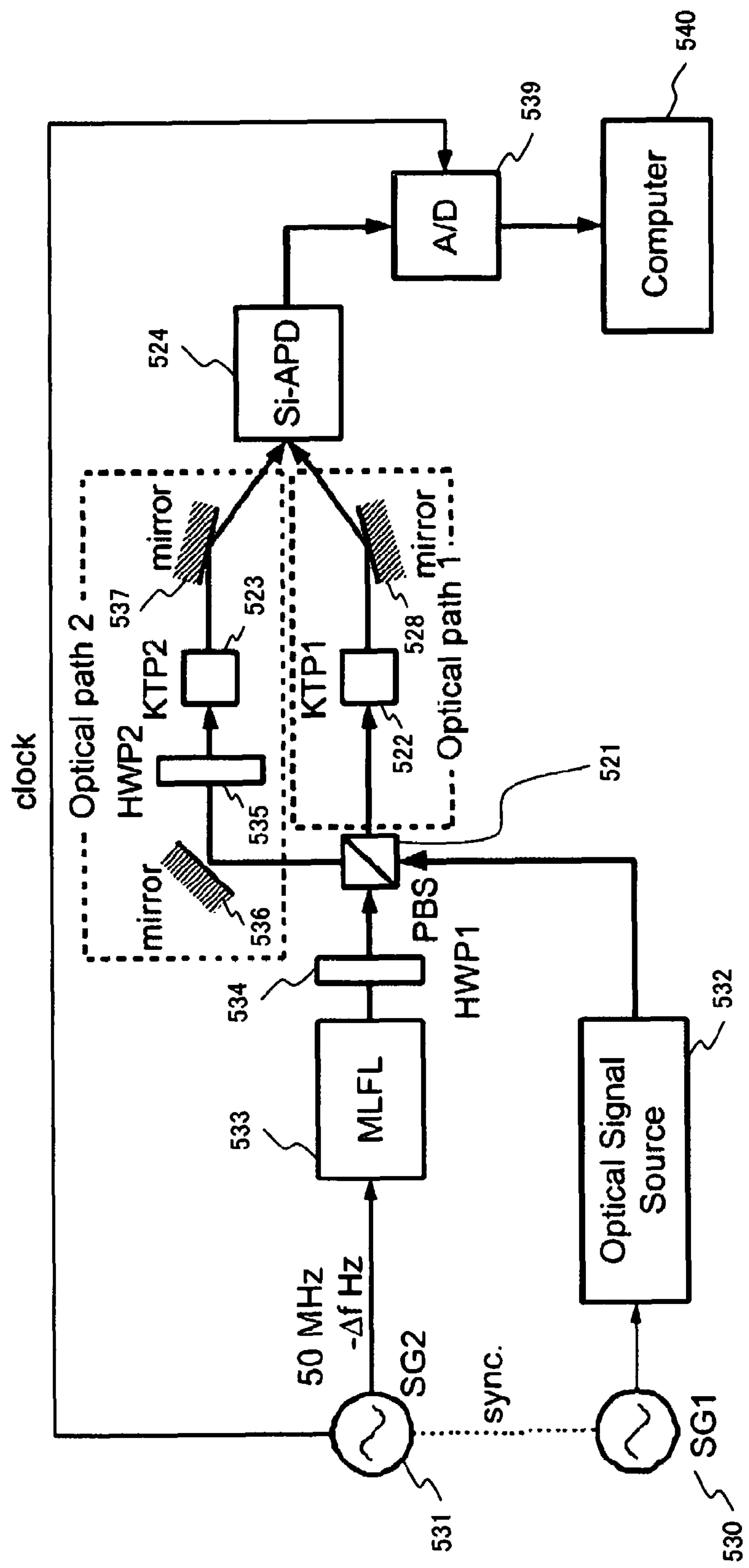
F I G. 3

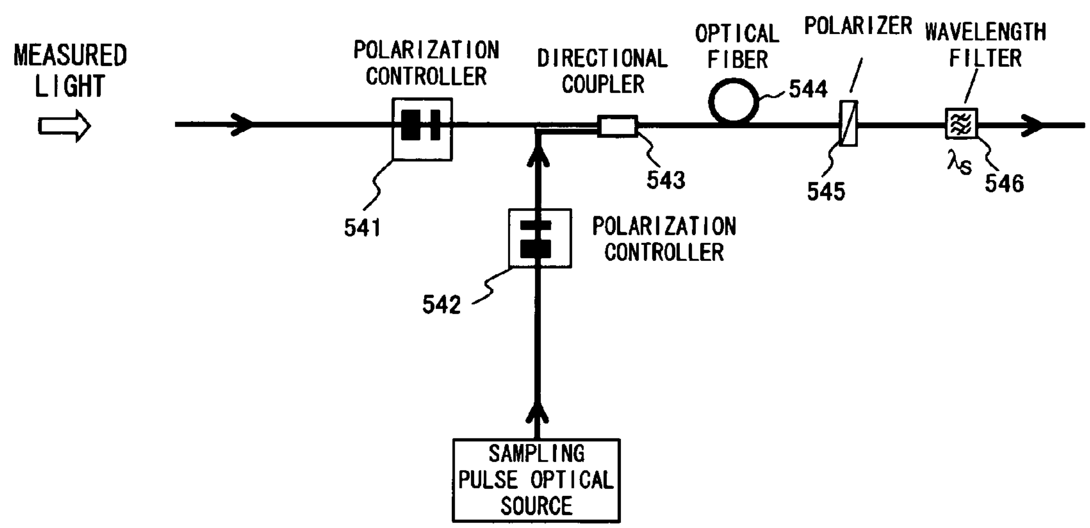
F I G. 4

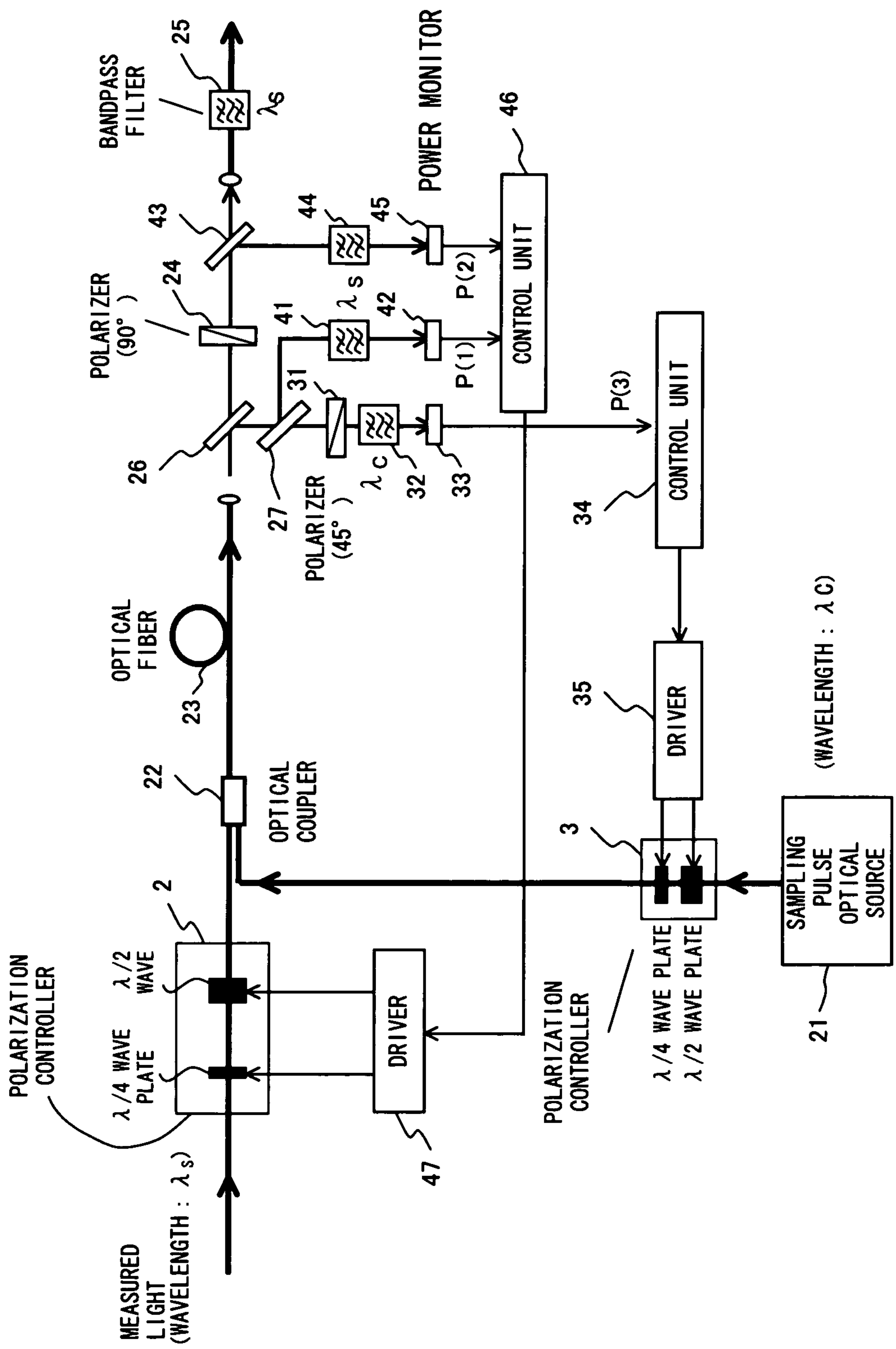
F I G. 7

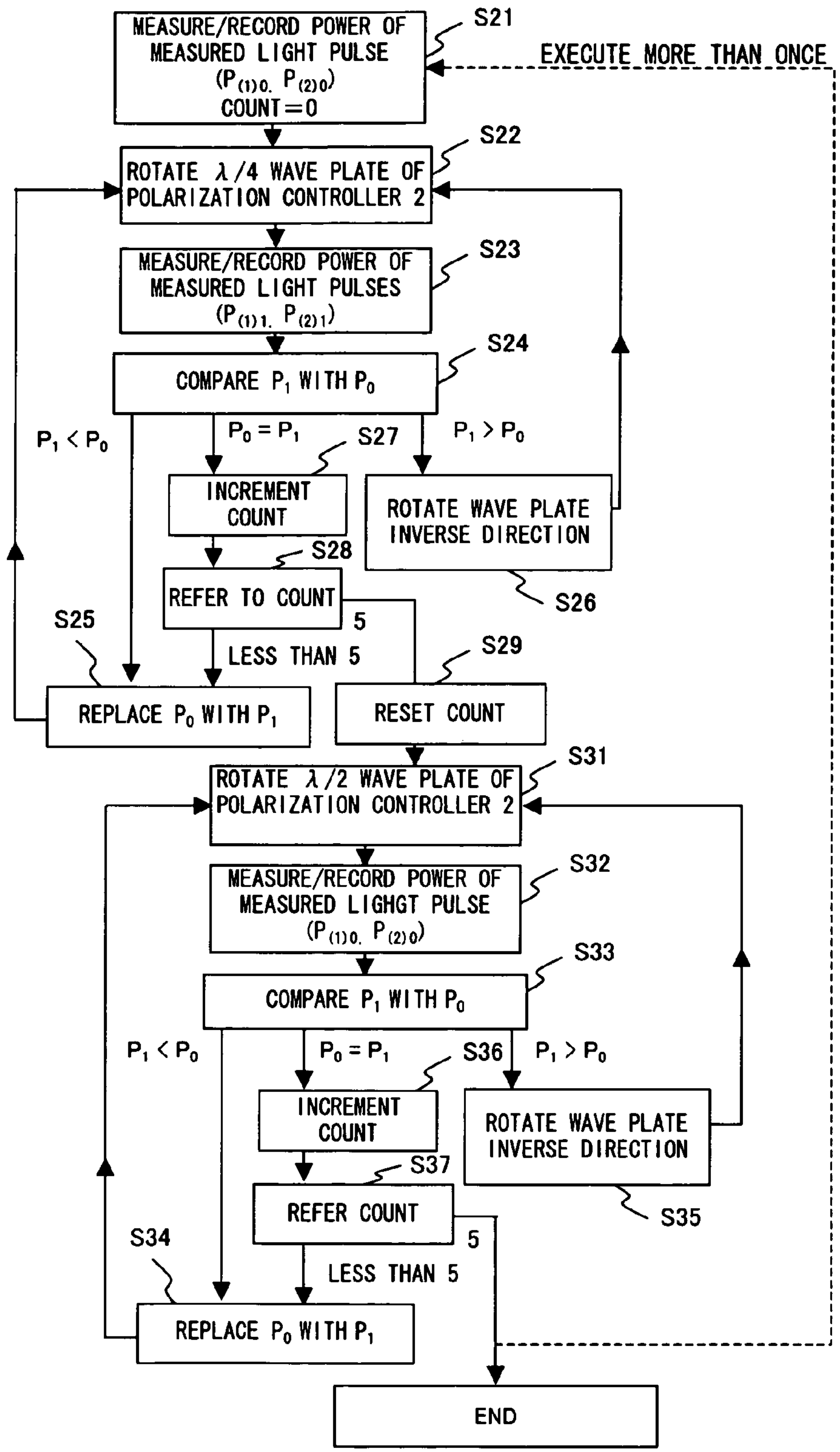
F I G. 1 0

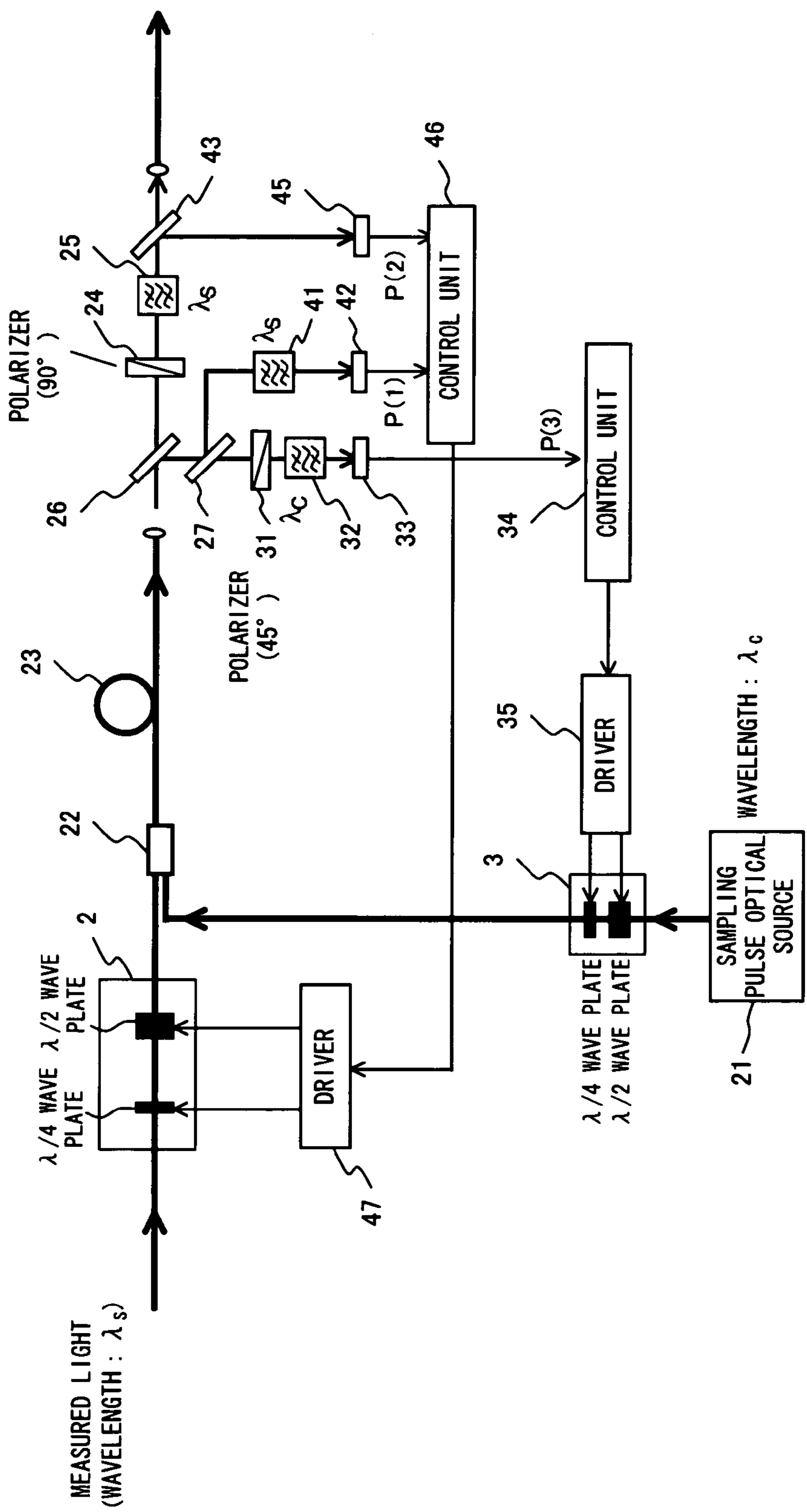
F I G. 1 2

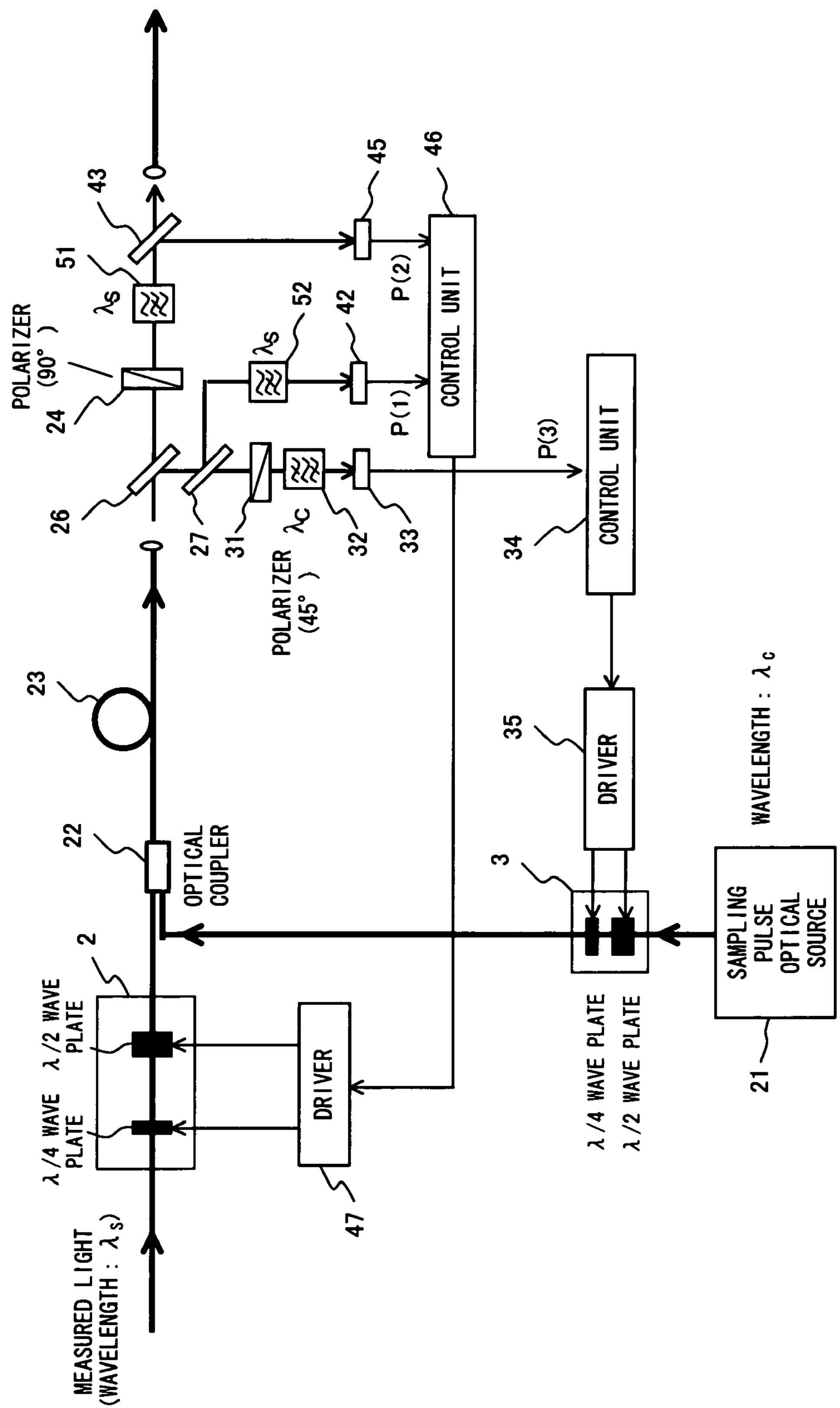
F I G. 14

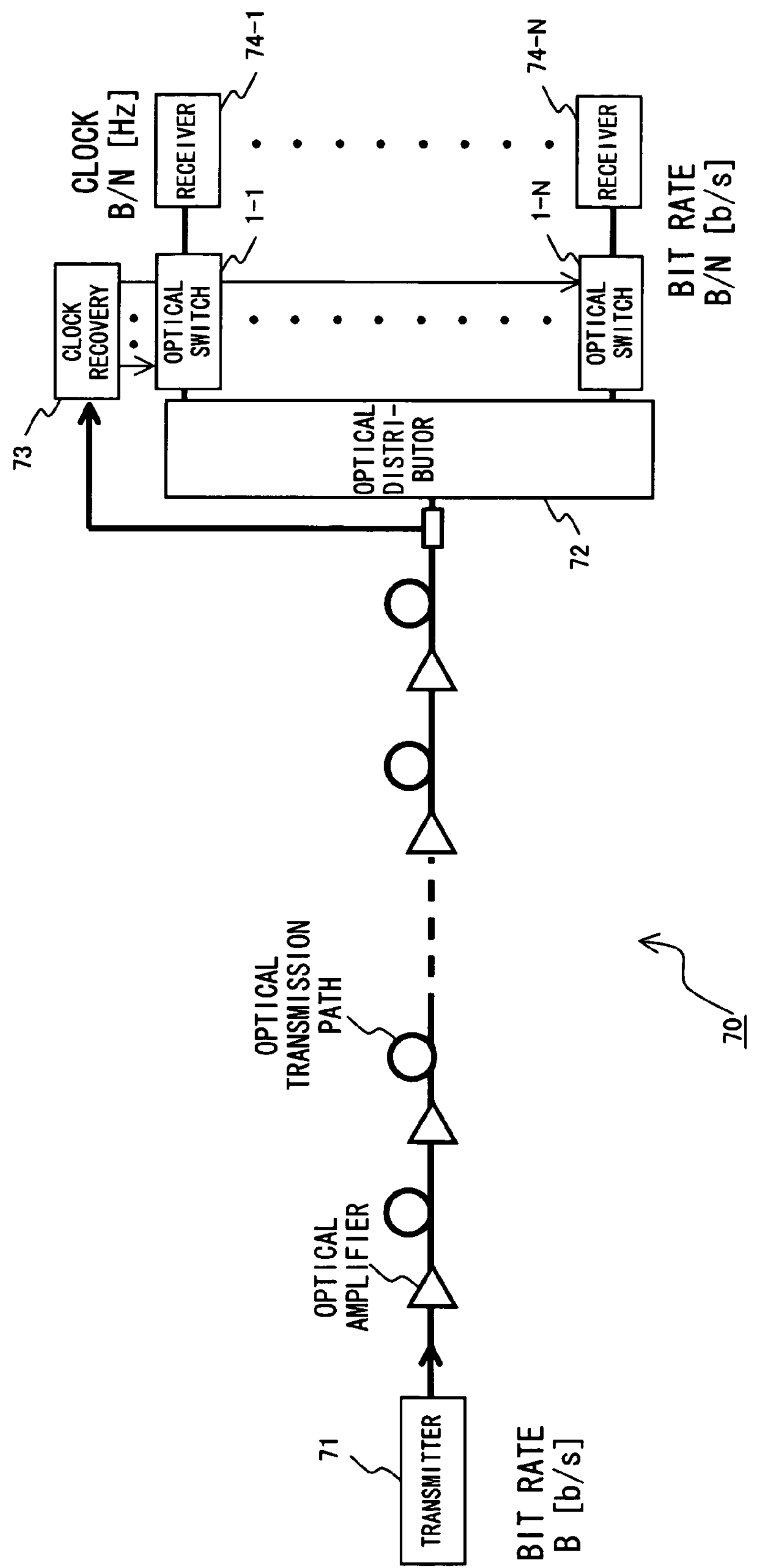
F I G. 1 7

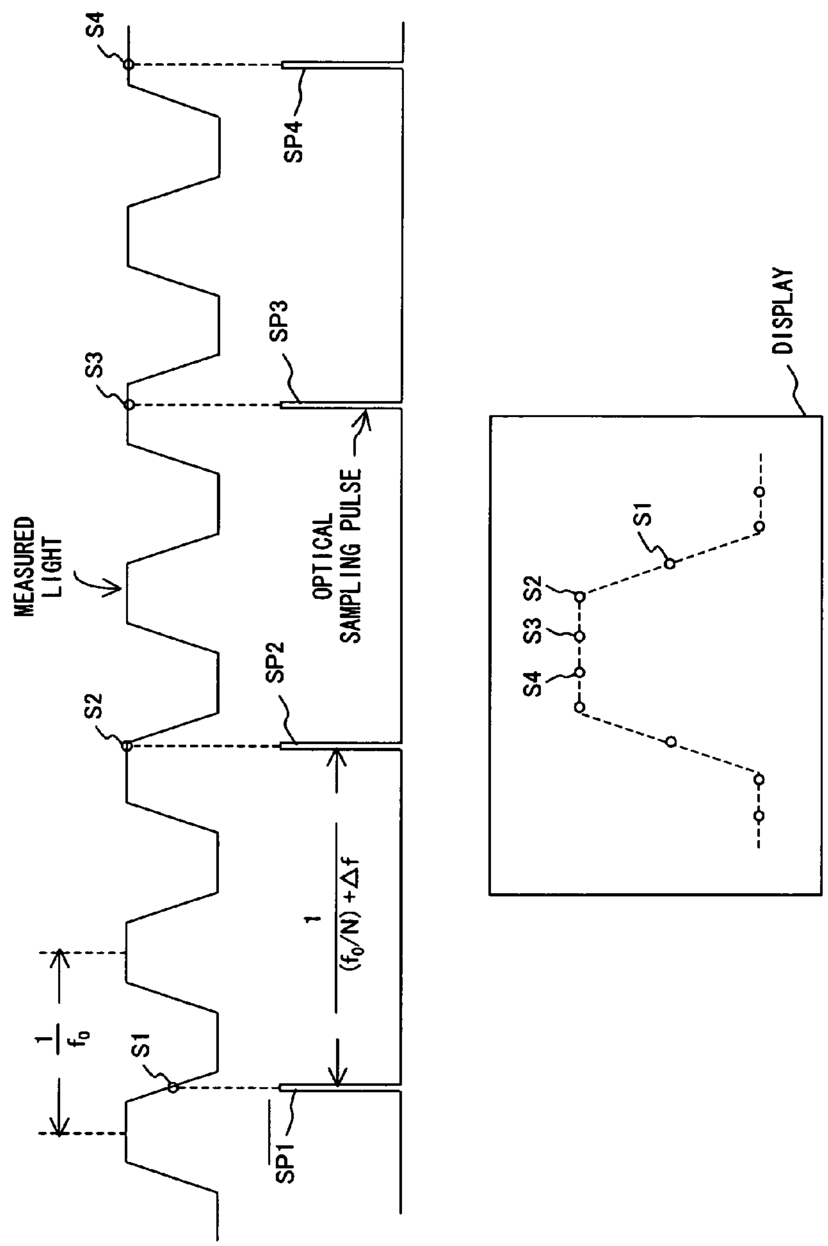
F I G. 1 8

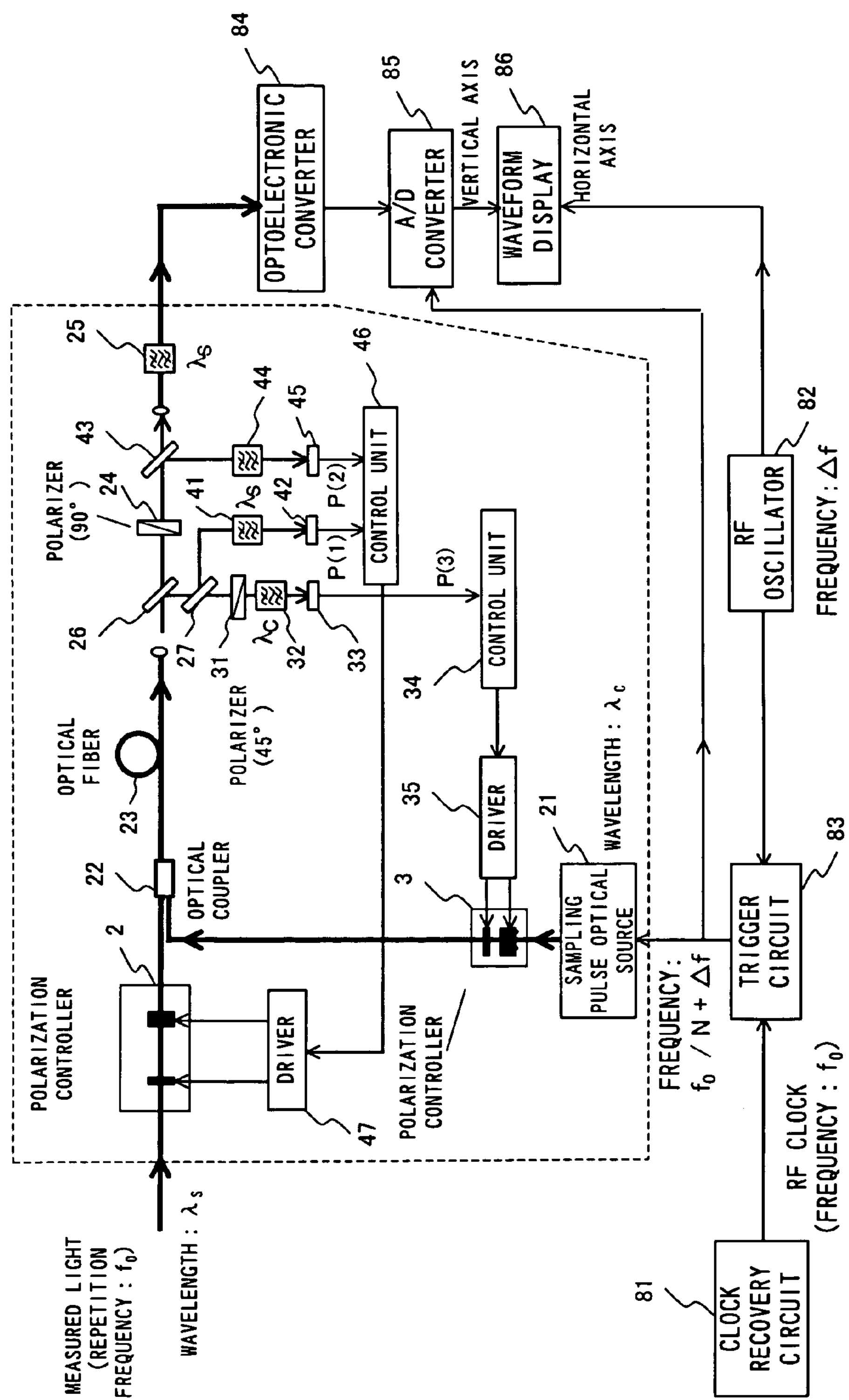
F I G. 19

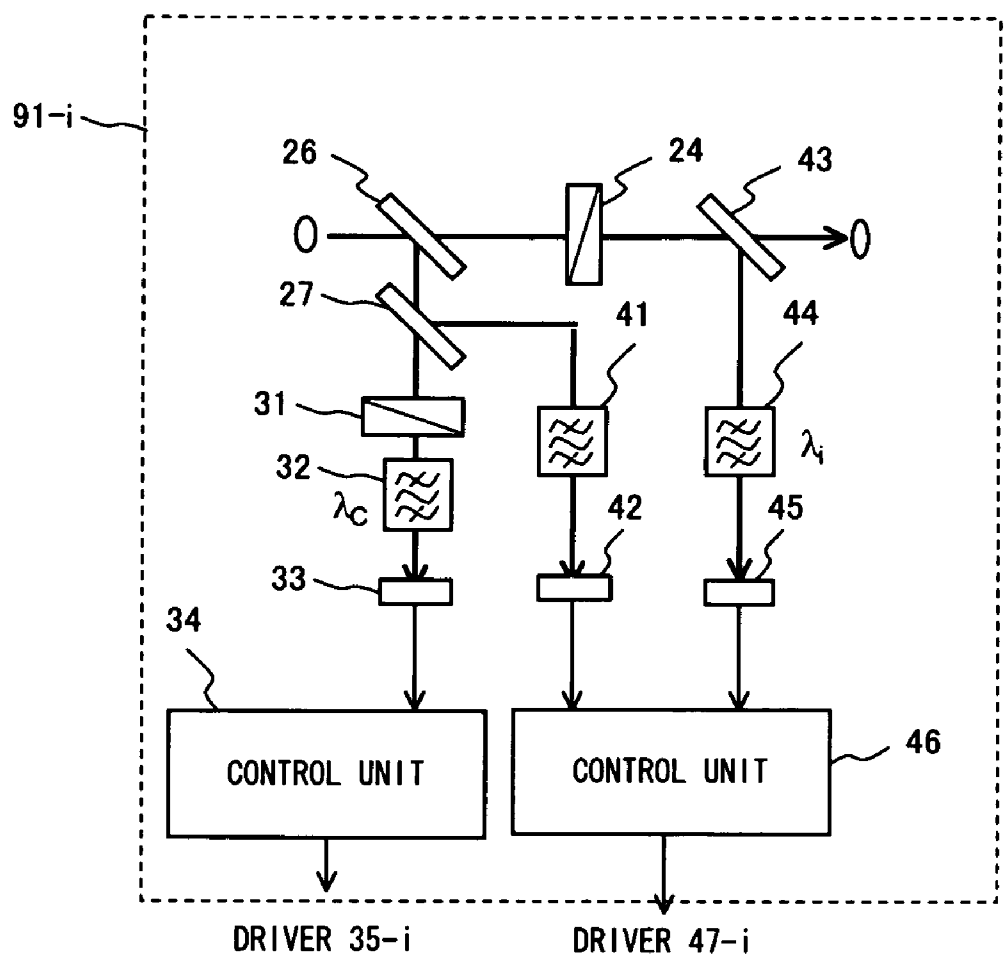
F I G. 2 1

OPTICAL WAVEFORM MEASUREMENT APPARATUS AND OPTICAL WAVEFORM MEASUREMENT METHOD

BACKGROUND OF THE INVENTION

1. Field of the Invention

The present invention relates to an optical waveform measurement apparatus and an optical waveform measurement method, and particularly relates to an optical waveform measurement apparatus and an optical waveform measurement method for measuring waveform of an optical signal with a high bit rate.

2. Description of the Related Art

A function to observe optical pulse waveforms is necessary for evaluating the quality of the optical signal in receivers of optical communication systems, and it can be applied for the purpose of monitoring the signal quality in optical nodes or optical repeaters in optical communication systems. Meanwhile, along with increase in the capacity for optical fiber communications, the bit rate of the optical signal has reached 40 Gb/s. In addition, as the next generation technology, the research and development of a system transmitting an optical signal at 160 Gb/s or higher is in progress. In order to support such research and development, an optical waveform measurement apparatus and an optical waveform measurement method allowing highly precise observation of the waveform of an optical signal are required. It should be noted that the function to measure or to observe optical pulse waveforms could be used for evaluating a variety of optical components.

The conventional optical waveform measurement apparatus converts a measured optical signal (optical pulse) into an electrical signal using an optoelectronic converter 501, as in an example of FIG. 1. A sampling pulse generation circuit 503 generates a sampling pulse in accordance with a trigger signal generated by a trigger circuit 502. At that time, the sampling pulse is not an optical signal but an electrical signal. A sampling circuit 504 conducts sampling of the electrical signal output from the optoelectronic converter 501 with the sampling pulse. A waveform display device 505 displays the sampling result. In other words, the waveform of an optical signal is observed after the optical signal is converted into an electrical signal.

At that time, in order to observe the waveform of the optical signal with high accuracy, all frequency components constituting the optical signal have to be received. For that reason, the waveform measurement apparatus needs to have a band sufficiently wider than the band corresponding to the bit rate of the optical signal. Here, the band observed by the waveform measurement apparatus shown in FIG. 1 is limited by a device having a narrowest band among the optoelectronic converter, the trigger circuit, the sampling circuit and the waveform display device. However, since the operation band of an electrical circuit is around 50 GHz, highly accurate observation of the optical signal with 40 Gb/s by a waveform measurement apparatus shown in FIG. 1 is considered to be difficult.

For a technology to solve the issue of band limitation, an optical sampling technique, which conducts sampling of optical signals without modification, is known widely. In the following, the optical sampling technique is explained with reference to FIG. 2A and FIG. 2B. Note that FIG. 2B is a schematic drawing of an operation of a waveform measurement apparatus shown in FIG. 2A. Assume that the measured light carries an optical pulse signal with a repetition frequency $f_0$.

An optical sampling gate 511 comprises a nonlinear optical medium, and generates an intensity correlation optical signal of the measured light and the optical sampling pulse. In this description, the intensity correlation optical signal refers to an optical signal generated by the measured light and the optical sampling pulse being overlapped in a time domain.

A sampling frequency signal generator 512 extracts a clock signal (frequency: $f_0$) from the measured light, and generates a sampling frequency signal (frequency: $f_0+\Delta f$) using the clock signal. A short pulse optical source 513 is driven by the sampling frequency signal. By so doing, an optical sampling pulse is generated. When both of the measured light and the optical sampling pulse are input to the optical sampling date 511, a nonlinear effect occurs. Then, an optical signal with intensity correlation of the measured light and the optical sampling pulse (i.e. the intensity correlation optical signal) is obtained.

The intensity correlation optical signal output from the optical sampling gate 511, after being converted into an electrical signal by the optoelectronic converter 514, is input to a vertical axis signal port of the waveform display device 515. To a horizontal axis input port of the waveform display device 515, a frequency shift signal (frequency: $\Delta f$) is input. By so doing, the waveform display device 515 can display the waveform of the measured light. Here, the frequency $\Delta f$ is substantially low, compared with the frequency $f_0$. Therefore, the issue of the band limitation should be solved.

However, the nonlinear effect, which occurs in the nonlinear optical medium of the optical sampling gate 511, depends on polarization states of the incident measured light and optical sampling pulse. Consequently, accurate observation of the waveform of an optical signal with an arbitrary polarization state is difficult by the optical waveform measurement apparatus shown in FIG. 2A.

Non-patent Document 1 describes an optical waveform measurement apparatus, which solves the above issue of the polarization dependency. The apparatus described in Non-patent Document 1 employs a polarization diversity scheme as shown in FIG. 3. That is, an optical signal is separated into a TE polarization component and a TM polarization component by using a polarization beam splitter (PBS) 521. The TE polarization component and the TM polarization component are input to KTP crystals 522 and 523, respectively, which are provided as a nonlinear optical medium. A pair of the optical signals output from the KTP crystals 522 and 523 is guided to a photo detector element 524. Note that the apparatus comprises transmitters 530 and 531, an optical source 532 for generating an optical sampling pulse, a mode locked fiber laser (MLFL) 533 for generating the measured light, half wave plates (HWP) 534 and 535, mirrors 536-538, an A/D converter 539, and a computer 540.

Non-patent document 2 describes another optical waveform measurement apparatus, which also solves the above issue of the polarization dependency. The apparatus described in Non-patent document 2 comprises polarization controllers for controlling each of the polarization states of the measured light and the optical sampling pulse, as shown in FIG. 4. That is, a polarization controller 541 controls the polarization state of the measured light, and a polarization controller 542 controls the polarization state of the optical sampling pulse. A directional coupler 543 combines the measured light and the optical sampling pulse, each having controlled polarization states, and guides them to an optical fiber 544. The optical fiber 544 is a nonlinear optical medium, and causes a nonlinear effect. A polarizer 545 extracts a prescribed polarization component from the optical output of the optical fiber 544. A wavelength filter 546 extracts a wavelength component of the measured light.

The polarization direction of the measured light is controlled so as to be orthogonal to the polarization main axis of the polarizer 545. The polarization direction of the optical sampling pulse is controlled so that the polarization direction of the optical sampling pulse differs from that of the measured light by 40°-50° (preferably 45°). In such a configuration, if the optical pulse of the measured light overlaps the optical sampling pulse in a time domain, the optical pulse of the measured light is output via the polarizer 545, and if the optical pulse of the measured light does not overlap the optical sampling pulse in the time domain, the optical pulse of the measured light is blocked by the polarizer 545.

It should be noted that Patent Documents 1 and 2, and Non-patent Document 3 are known as technologies relating to the above optical waveform measurement.

[Patent Document 1]

Japanese Patent Application Publication No. 7-98464

[Patent Document 2]

Japanese Patent No. 3494661

[Non-Patent Document 1]

N. Yamada et al., "Polarization-*insensitive optical sampling system using two KTP crystals," IEEE Photonics technology letters, vol.* 16, No. 1, pp. 215-217, 2004

[Non-Patent Document 2]

S. Watanabe et al., "novel Fiber Kerr-Switch with Parametric Gain: Demonstration of Optical Demultiplexing and Sampling up to 640 Gb/s," Postdeadline session, Th4.1.6, 30$^{th}$ European Conference on Optical Communication, Sep. 5-9, 2004 Stockholm, Sweden

[Non-Patent Document 3]

S. Watanabe et al., "Ultrafast All-Optical 3R-Regeneration," IEICE Trans. Election, vol. E87-C, No. 7, July 2004

The configuration described in Non-Patent Document 1 requires two costly KTP crystals as the nonlinear optical medium. For that reason, cost reduction of the optical waveform measurement apparatus is difficult to achieve.

The configuration described in Non-Patent Document 2 requires setting of the polarization states of the measured light and the optical sampling pulse before operating the optical waveform measurement apparatus. For that reason, if polarization change occurs in the optical fiber during the operation, accurate measurement of the optical waveform is difficult afterwards.

SUMMARY OF THE INVENTION

It is an object of the present invention to measure the waveform of a high-speed optical signal with high accuracy at all time in an optical waveform measurement apparatus having a relatively inexpensive configuration.

An optical waveform measurement apparatus according to the present invention comprises a first polarization controller for controlling a polarization state of measured light, a second polarization controller for controlling a polarization state of an optical sampling pulse for sampling the measured light, a nonlinear optical medium, to which the measured light having the polarization state controlled by the first polarization controller and the optical sampling pulse having the polarization state controlled by the second polarization controller are input, an extraction unit for extracting a prescribed linear polarization component from an optical signal output from the nonlinear optical medium, a first adjustment unit for adjusting the first polarization controller, based on an optical signal output from the nonlinear optical medium, so that a polarization direction of the measured light has a first angle with respect to a polarization component extraction axis of the extraction unit, and a second adjustment unit for adjusting the second polarization controller, based on at least one of an optical signal output from the nonlinear optical medium and an optical signal output from the extraction unit, so that a polarization direction of the optical sampling pulse has a second angle with respect to a polarization component extraction axis of the extraction unit. An optical signal output from the extraction unit is used for waveform measurement of the measured light.

In the above apparatus, the first and second polarization controllers are adjusted based on the measured light and the optical sampling pulse actually used during the operation of the optical waveform measurement apparatus. Therefore, the polarization states of the measured light and the optical sampling pulse can be appropriately controlled at all time even during the operation of the optical waveform measurement apparatus.

According to the present invention, since the polarization states of the measured light and the optical sampling pulse are appropriately controlled even during the operation of the optical waveform measurement apparatus, it is possible to measure or observe the waveform of the optical signal precisely.

BRIEF DESCRIPTION OF THE DRAWINGS

FIG. 1 is a diagram showing a configuration of a first conventional optical waveform measurement apparatus;

FIG. 3 is a diagram showing a configuration of a third conventional optical waveform measurement apparatus;

FIG. 4 is a diagram showing a configuration of a fourth conventional optical waveform measurement apparatus;

FIG. 7 is a diagram showing a configuration of the optical sampling circuit used in the optical waveform measurement apparatus of the embodiments of the present invention;

FIG. 10 is a flowchart showing the operation of the control unit for controlling the polarization state of the measured light;

FIG. 12 to FIG. 16 are variations of the optical sampling circuits;

FIG. 17 is a diagram describing the configuration of an optical transmission system using the optical switch relating to the present invention;

FIG. 18 is a diagram explaining a operation principle of the optical sampling oscilloscope;

FIG. 19 is a diagram showing a detailed configuration of the optical waveform measurement apparatus of the embodiment;

FIG. 21 is a diagram showing a configuration of the monitor circuit; and

DESCRIPTION OF THE PREFERRED EMBODIMENTS

Figure 2A:
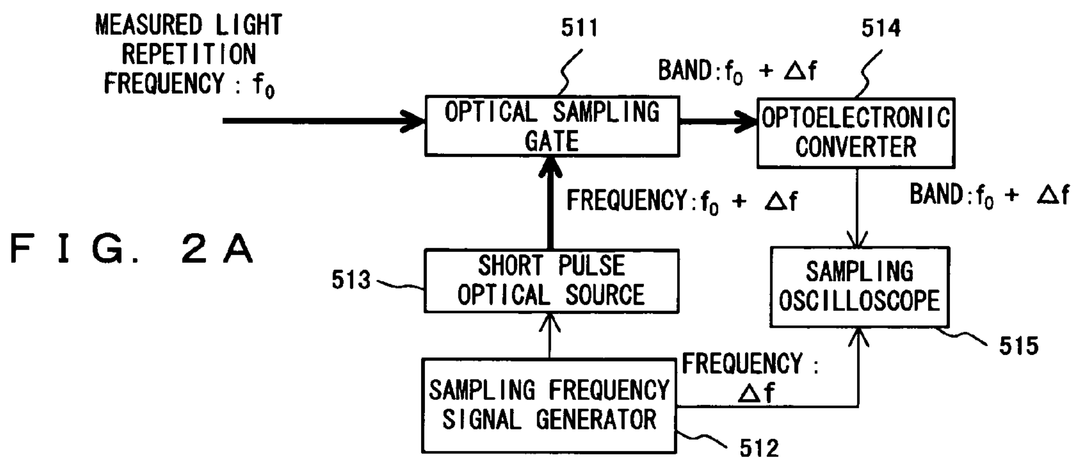
FIGS. 2A and 2B are diagrams showing a configuration of a second conventional optical waveform measurement apparatus.
Figure 2B:
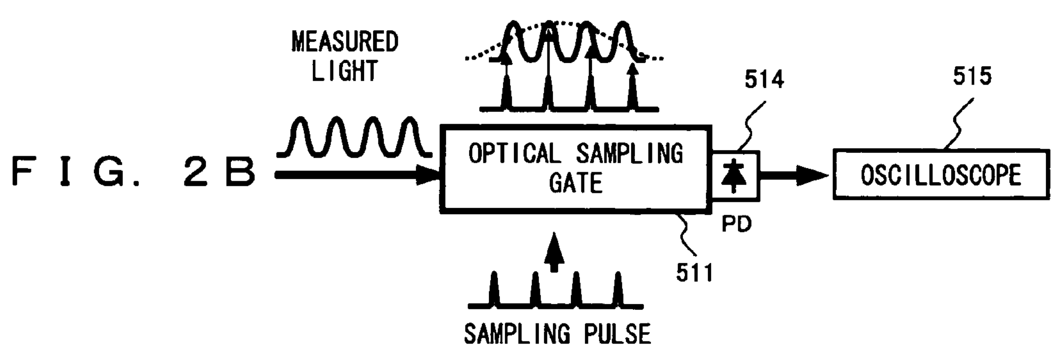
Figure 5:
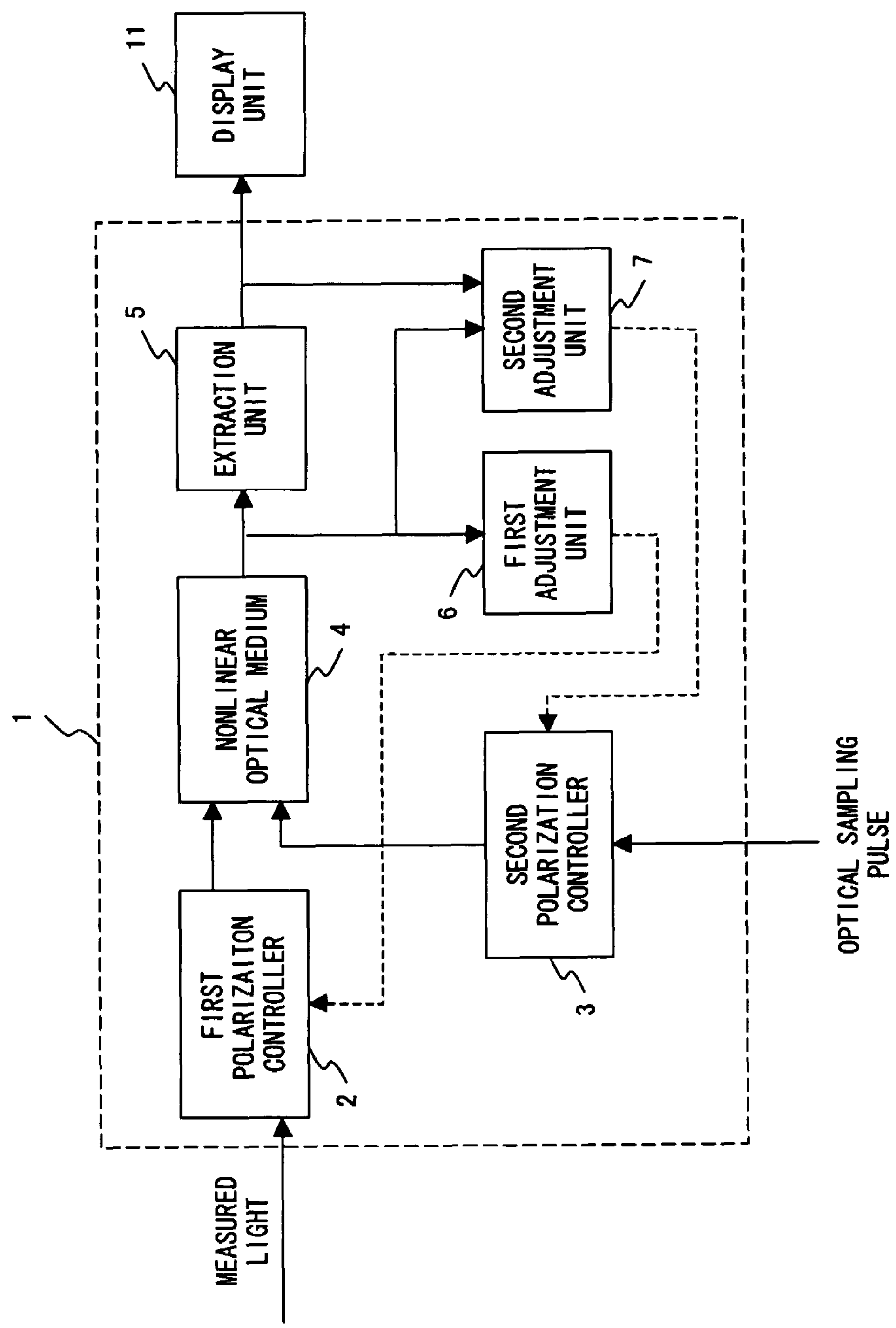
FIG. 5 is a diagram showing a fundamental configuration of the optical waveform measurement apparatus of the present invention.

FIG. 5 is a diagram showing a fundamental configuration of the optical waveform measurement apparatus of the present invention. The optical waveform measurement apparatus of the present invention observes or measures the waveform of an optical signal carried by measured light, and specifically, the apparatus comprises a function for displaying the shape of the optical waveform by optical sampling. The optical waveform measurement apparatus of the present invention also comprises an optical sampling circuit 1 and a display unit 11.

A first polarization controller 2 controls a polarization state of the measured light in accordance with an instruction from a first adjustment unit 6. A second polarization controller 3 controls a polarization state of an optical sampling pulse for sampling the measured light in accordance with an instruction from a second adjustment unit 7. The measured light, the polarization state of which is controlled by the first polarization controller 2, and the optical sampling pulse, the polarization state of which is controlled by the second polarization controller 3, are input to a nonlinear optical medium 4. The polarization state of the measured light is changed by a nonlinear effect in the nonlinear optical medium 4. Note that the nonlinear effect is caused by the optical sampling pulse. An extraction unit 5 can be a polarizer, for example, and extracts a prescribed linear polarization component from an optical signal output from the nonlinear optical medium 4.

The first adjustment unit 6 adjusts the first polarization controller 1 so that the polarization direction of the measured light has a first angle with respect to a polarization component extraction axis of the extraction unit 5, based on the optical signal output from the nonlinear optical medium 4. The second adjustment unit 7 adjusts the second polarization controller 2 so that the polarization direction of the optical sampling pulse has a second angle with respect to the polarization component extraction axis of the extraction unit 5, based on the optical signal output from the nonlinear optical medium 4 and the optical signal output from the extraction unit 5. Here, the first adjustment unit 6 and the second adjustment unit 7 can operate independently from each other. The second adjustment unit 7 may adjust the second polarization controller 2 based on either one of the optical signal output from the nonlinear optical medium 4 or the optical signal output from the extraction unit 5. The display unit 11 can be an oscilloscope, and displays the waveform of the optical signal carried by the measured light by using the optical signal extracted by the extraction unit 5.

Figure 6A:
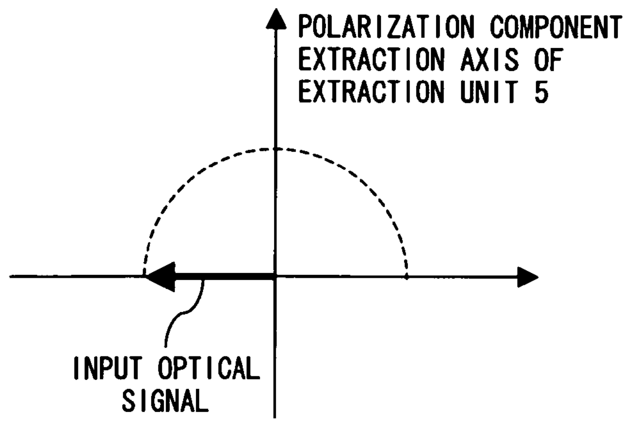
FIGS. 6A-6C are diagrams explaining an operation of the optical sampling circuit.
Figure 6B:
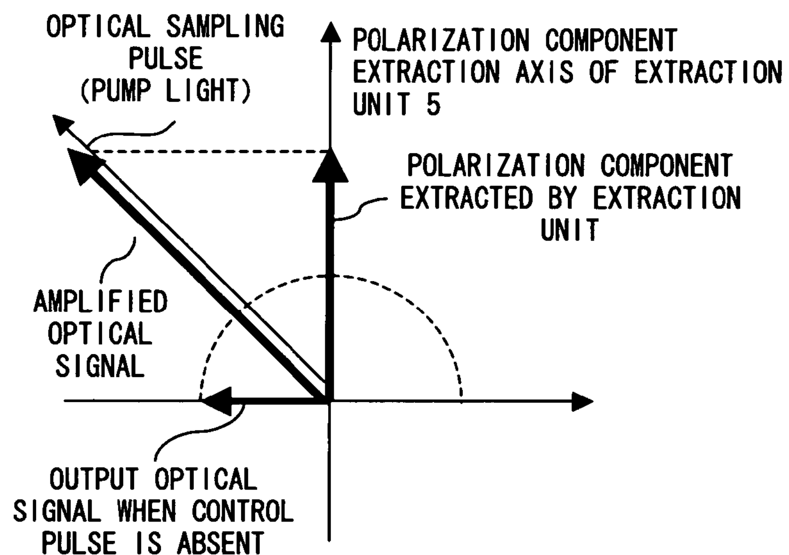
Figure 6C:
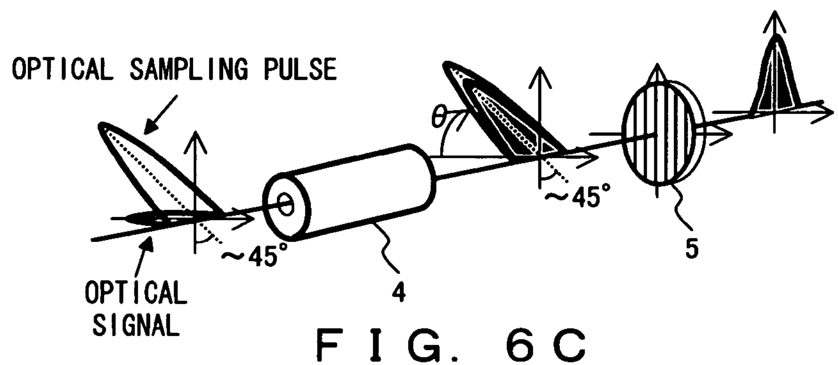

FIGS. 6A-6C are diagrams explaining the operation of an optical sampling circuit 1. In the optical sampling circuit 1, the polarization direction of the input optical signal (the measured light) is controlled so as to be approximately orthogonal to the polarization component extraction axis of the extraction unit 5, as shown in FIG. 6A. Here, if the extraction unit 5 is a polarizer, the polarization component extraction axis is equivalent to a polarization main axis of the polarizer.

In a time domain where the optical sampling pulse is absent, the polarization state of the optical signal does not change in the nonlinear optical medium 4, as show in FIG. 6B. That is, in such a case, the polarization direction of the optical signal output from the nonlinear optical medium 4 is orthogonal to the polarization component extraction axis of the extraction unit 5. Therefore, in this case, the optical signal is blocked by the extraction unit 5.

The polarization direction of the optical sampling pulse is, as shown in FIGS. 6B and 6C, controlled in a direction of 40°-50° (preferably 45°) with respect to the polarization component extraction axis of the extraction unit 5. In other words, the polarization direction of the optical sampling pulse is controlled so that the polarization direction of the optical signal and the polarization direction of the optical sampling pulse are different from each other by 40°-50° (preferably 45°)

In a time domain where the optical sampling pulse is present, the polarization state of the optical signal changes under the influence of the optical sampling pulse in the nonlinear optical medium 4. Assume that the peak power of the optical sampling pulse is sufficiently larger than the power of the optical signal. Under the assumption, the optical signal is parametrically amplified by the optical sampling pulse due to the nonlinear effect in the nonlinear optical medium 4, and additionally, the polarization direction of the optical signal approximately matches the polarization direction of the optical sampling pulse. In other words, the optical signal amplified by the optical sampling pulse in the nonlinear optical medium 4 contains a relatively large polarization component in a direction of the polarization component extraction axis of the extraction unit 5. Consequently, in the time domain where the optical sampling pulse is present, a part of polarization components of the amplified optical signal is extracted by the extraction unit 5. At that time, the optical wavelength of the light carrying the optical signal is not changed by the nonlinear effect. Note that the configuration and the operation of the above optical sampling circuit (optical switch) is also described, for example, in Japanese Patent Application No. 2005-200572 (U.S. Ser. No. is 11/216,213) in the name of the same applicant as the present patent application.

In order to realize the optical sampling shown in FIG. 6C, the polarization direction of the measured light is controlled to be approximately orthogonal to the polarization component extraction axis of the extraction unit 5, the polarization direction of the optical sampling pulse is controlled in a direction of 40°-50° (preferably 45°) with respect to the polarization component extraction axis of the extraction unit 5. Alternatively, the polarization direction of the optical sampling pulse is controlled so that the polarization direction of the measured light and the polarization direction of the optical sampling pulse are different from each other by 40°-50° (preferably 45°). In the embodiments of the present invention, the first adjustment unit 6 and the second adjustment unit 7 constantly adjust the states of the polarization controllers 2 and 3 in parallel with the operation for measuring the waveform of the measured light.

<Optical Sampling Circuit (Optical Switch)>

FIG. 7 is a diagram showing a configuration of the optical sampling circuit used in the optical waveform measurement apparatus of the embodiments of the present invention. It should be noted that the optical sampling circuit is not only for the use in the optical waveform measurement apparatus, but it is applicable to other usage. The optical sampling circuit can operate as an optical switch for extracting the M optical pulses from the N optical pulses (M<N).

The first polarization controller 2 (hereinafter simply referred to as "polarization controller 2") controls the polarization state of the measured light. In this case, the measure light carries an optical signal, the waveform of which is to be observed. The optical signal is an optical pulse signal with a repetition frequency $f_0$, for example. The repetition frequency $f_0$ is not limited in particular; however, it is assumed to be a several ten Gb/s, for example. The wavelength of the measured light is assumed to be $\lambda_s$.

A sampling pulse optical source 21 generates an optical sampling pulse for sampling of the measured light. The repetition frequency of the optical sampling pulse is "$f_0/N+\Delta f$", for example. "N" is an integer including 1, and "$\Delta f$" is a frequency substantially smaller than $f_0$. The wavelength of the light carrying the optical sampling pulse is $\lambda_c$.

The second polarization controller 3 (hereinafter simply referred to as "polarization controller 3") controls the polarization state of the optical sampling pulse. Note that the polarization controllers 2 and 3 are wave plate polarization controllers in the present embodiment. The wave plate polarization controller comprises $\lambda/4$ wave plate and $\lambda/2$ wave plate, and controls the polarization state of the incident light by individually rotating those wave plates.

An optical coupler 22 combines the measured light having the polarization state controlled by the polarization controller 2 and the optical sampling pulse having the polarization state controlled by the polarization controller 3, and guides them to an optical fiber 23. The optical fiber 23 is an embodiment of the nonlinear optical medium 4 shown in FIG. 5, and it is preferable to use a highly nonlinear optical fiber, for example. In the optical fiber 23, as explained with reference to FIGS. 6A-6C, the polarization state of the measured light is changed by the nonlinear effect caused by the optical sampling pulse. The measured light is parametrically amplified by the optical sampling pulse.

The optical signal output from the optical fiber 23 (including the measured light and the optical sampling pulse) is directed to a polarizer 24 by free space transmission. The polarizer 24, corresponding to the extraction unit 5 shown in FIG. 5, extracts a prescribed linear polarization component. Note that the operation of the polarizer 24 is the same as explained with reference to FIGS. 6A-6C. The transmissive wavelength of the bandpass filter 25 is $\lambda_s$. In other words, the bandpass filter 25 extracts and outputs the measured light, while removing the optical sampling pulse.

Figure 8:
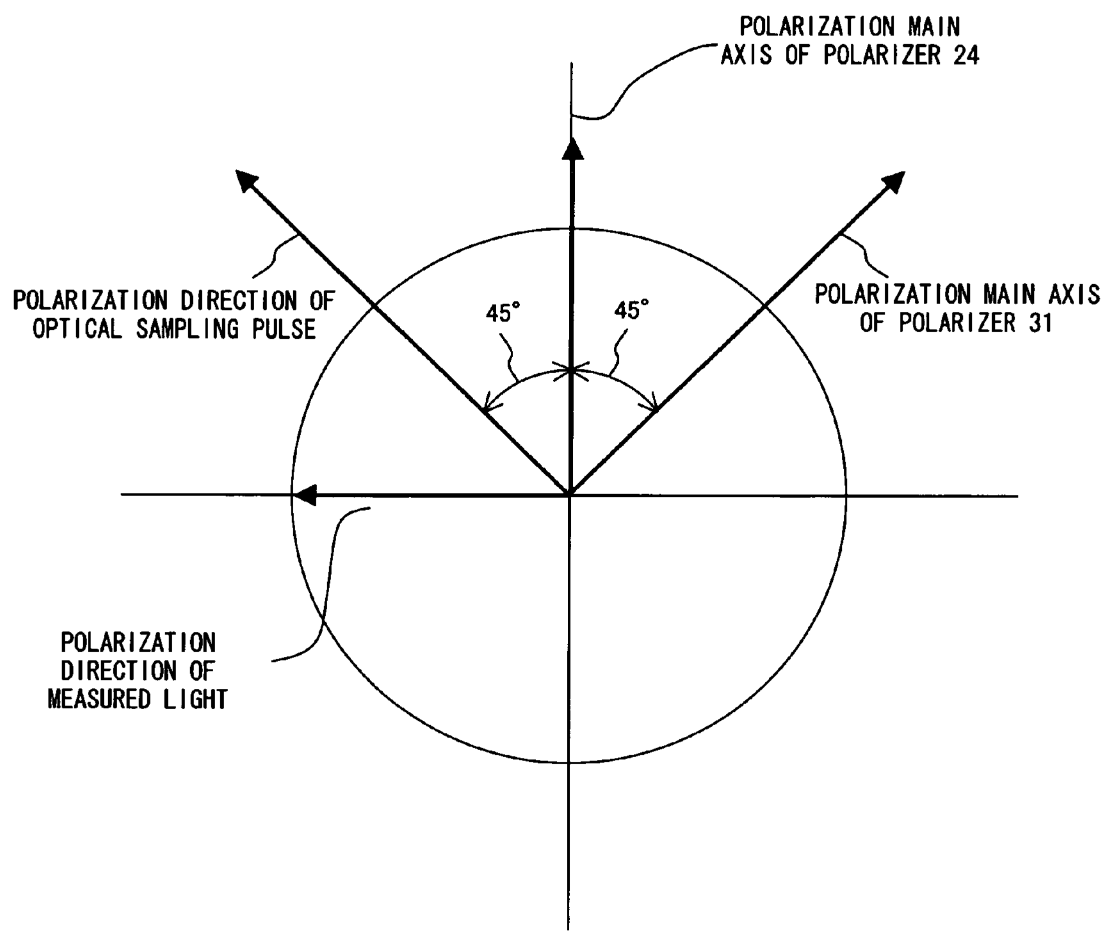
FIG. 8 is a diagram explaining the setting of the polarizer.

The optical signal output from the optical fiber 23 is split by optical splitters 26 and 27, and the split signals are guided to a polarizer 31 and a bandpass filter 41. A polarization main axis (polarization component extraction axis) of the polarizer 31 is set in a direction rotated clockwise by 45° from the polarization main axis (polarization component extraction axis) of the polarizer 24, as shown in FIG. 8. Here, the polarization direction of the optical sampling pulse is, as explained with reference to FIGS. 6A-6C, controlled in a direction rotated counterclockwise by approximately 45° from the polarization main axis of the polarizer 24. In other words, the polarization direction of the optical sampling pulse is controlled so as to be orthogonal to the polarization main axis of the polarizer 31 by setting the polarization main axis of the polarizer 31 as described above.

The transmissive wavelength of the bandpass filter 32 is $\lambda_c$. That is, the bandpass filter 32 extracts the wavelength component of the optical sampling pulse from the optical output of the polarizer 31. Note that the bandpass filter 32 may be provided to the input side of the polarizer 31 instead of being provided in the output side of the polarizer 31. A photo detector 33 is for example a photodiode, and detects the power of the optical signal passing through the bandpass filter 32. In other words, the photo detector 33 detects the power of the optical sampling pulse extracted by the polarizer 31.

A control unit 34 generates a control signal for adjusting the state of the polarization controller 3 based on the optical power detected by the photo detector 33. Note that details of the operation of the control unit 34 are provided later. A driver 35 controls the state of the polarization controller 3 in accordance with the control signal generated by the control unit 34. As described above, the state of the polarization controller 3 is controlled by feedback control using the optical signal output from the optical fiber 23.

The transmissive wavelength of a bandpass filter 41 is $\lambda_s$. That is, the bandpass filter 41 extracts the wavelength component of the measured light from the optical signal output from the optical fiber 23. A photo detector 42 is for example a photodiode, and detects the optical power of the optical signal passing through the bandpass filter 41. In other words, the photo detector 42 detects the power of the measured light output from the optical fiber 23.

The optical signal output from the polarizer 24 is split by an optical splitter 43, and is guided to a bandpass filter 44. The transmissive wavelength of the bandpass filter 44 is $\lambda_s$. That is, the bandpass filter 44 extracts the wavelength component of the measured light from the optical signal output from the polarizer 24. A photo detector 45 is for example a photodiode, and extracts the power of the optical signal passing through the bandpass filter 44. In other words, the photo detector 45 detects the power of the measured light output from the polarizer 24.

A control unit 46 generates a control signal for adjusting the state of the polarization controller 2 based on the optical power detected by the photo detector 42 and the optical power detected by the photo detector 45. Note that the details of the operation of the control unit 46 are provided later. A driver 47 controls the state of the polarization controller 2 in accordance with the control signal generated by the control unit 46. As described above, the state of the polarization controller 2 is controlled by feedback control using the optical signal output from the optical fiber 23 and the optical signal output from the polarizer 24.

Figure 9:
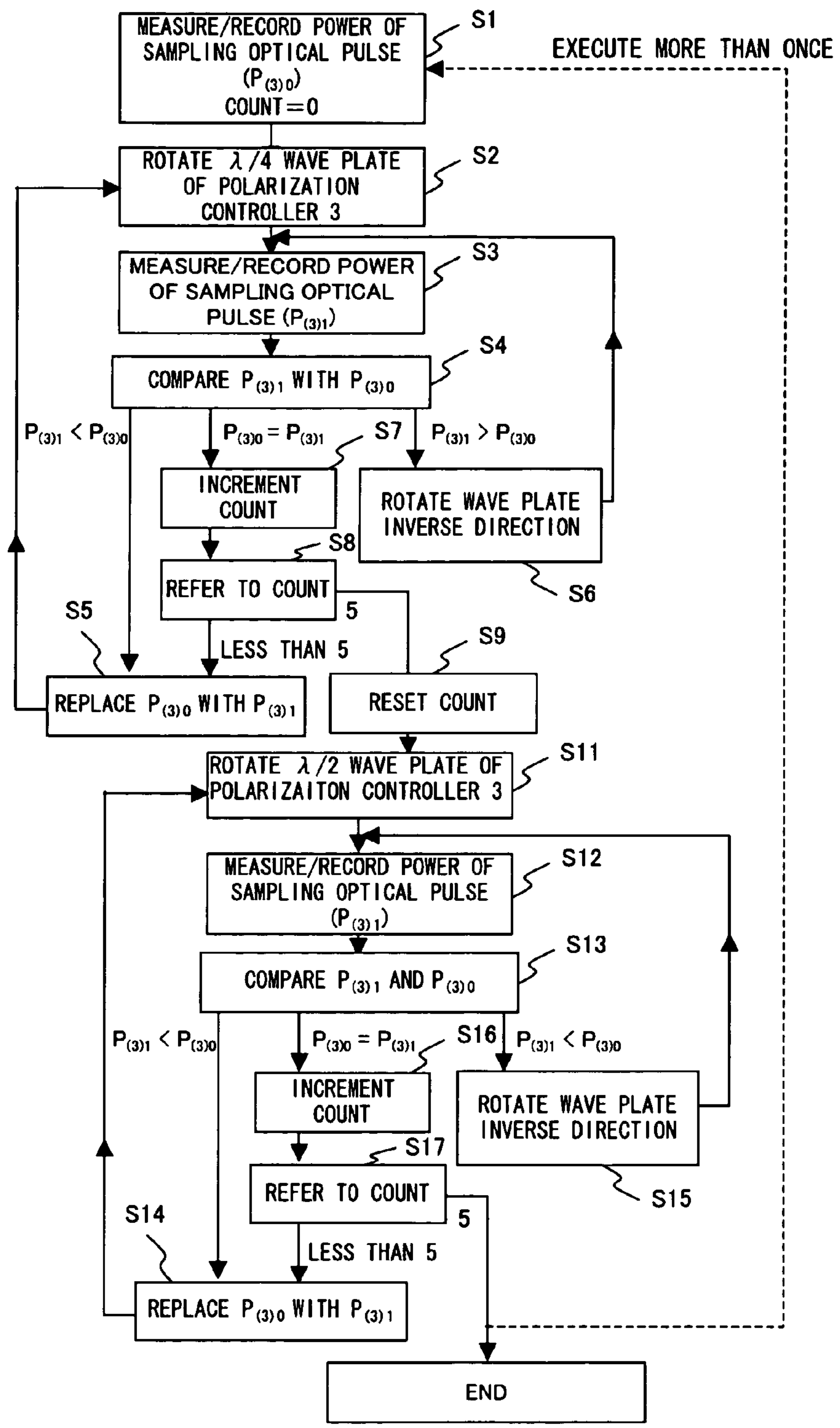
FIG. 9 is a flowchart showing the operation of the control unit for controlling the polarization state of the optical sampling pulse.

FIG. 9 is a flowchart showing the operation of the control unit 34 for controlling the polarization state of the optical sampling pulse. The process of the flowchart is executed constantly or periodically. In addition, the process of the flowchart can be executed in parallel with the operation for measuring the waveform of the measured light.

The polarization direction of the optical sampling pulse is preferably controlled in a direction rotated by approximately 45° from the polarization main axis of the polarizer 24, as explained above. In this case, the polarization direction of the optical sampling pulse is orthogonal to the polarization main axis of the polarizer 31, and consequently, the optical sampling pulse is blocked by the polarizer 31. In other words, if the polarization direction of the optical sampling pulse is properly controlled, the power o the optical sampling pulse detected by the photo detector 33 should be minimized. Thus, the control unit 34 adjusts the state of the polarization controller 3 so that the power of the optical sampling pulse detected by the photo detector 33 is minimized.

In step S1, the power of the optical sampling pulse output from the optical fiber 23 is detected, and the detected value is stored as "P(3)0". Additionally, the counter for counting a control variable is initialized. Note that in this flowchart, the power of the optical sampling pulse is detected by the photo detector 33.

Steps S2-S9 are processes for adjusting the angle of the λ/4 wave plate of the polarization controller 3. That is, in step S2, the λ/4 wave plate of the polarization controller 3 is rotated in a prescribed direction (hereinafter the direction is assumed to be clockwise) by a given amount by providing a control signal to the driver 35. Here, "a given amount" is not limited in particular; however, it is an amount of rotation, which slightly changes the polarization state of the measured light. In step S3, the power of the optical sampling pulse is detected, and the detected value is stored as "P(3)1".

In step S4, "P(3)0" is compared with "P(3)1". If "P(3)1<P(3)0", it is determined that the λ/4 wave plate needs to be further rotated clockwise, and the process returns to step S2 after executing the process of step S5. In step S5, "P(3)1" obtained in step S3 is assigned to "P(3)0". By so doing, "P(3)1" obtained in step S3 is used as "P(3)0" in the next process routine. On the other hand, if "P(3)1>P(3)0", it is determined that the λ/4 wave plate needs to be rotated counterclockwise, and the process proceeds to step S6. In step S6, the λ/4 wave plate is once restored to be the state before the execution of step S2, and the λ/4 wave plate is rotated counterclockwise by a given amount. Afterwards, the process returns to step S3.

If "P(3)0=P(3)1", the counter is incremented by 1 in step S7, and the value of the counter is checked in step S8. In this case, "P(3)0=P(3)1" includes a state where two values are approximately match (i.e. the difference in the two values is smaller than a prescribed threshold) in addition to a state where the two values matches completely. If the value of the counter is smaller than a specified value (5 in this example), the process returns to step S2 via step S5. On the other hand, the value of the counter has reached "5", the counter is reset in the step S9, and the process proceeds to step S11.

Processes in steps S11-S17 are basically the same as the processes in steps S2-S8 explained above. However, in steps S11-S17, the angle of the λ/2 wave plate of the polarization controller 3 is adjusted. Note that steps S1-S17 may be repeated more than once.

By executing steps S1-S17 as described above, the power of the optical sampling pulse detected by the photo detector 33 is minimized. In other words, the polarization state of the optical sampling pulse is optimized. It should be noted that in the above embodiment, the control to minimize the power detected by the photo detector 33 is performed. Alternatively, a control to reduce the power to less than a prescribed threshold may be performed.

FIG. 10 is a flowchart showing the operation of the control unit 46 for controlling the polarization state of the measured light. Processes in the flowchart are constantly or regularly repeated. The processes of the flowchart can be executed in parallel with the operation for measuring the waveform of the measured light. The processes of the flowchart shown in FIG. 9 and FIG. 10 can be executed independently from each other.

Processes of steps S21-S29 and S31-S37 in the flowchart of FIG. 10 are basically the same as the processes of steps S1-S9 and S11-S17. The processes of steps S21-S37 maybe repeated more than once. However, in the flowchart shown in FIG. 10, the power of the measured light output from the optical fiber 23 and the power of the measured light output from the polarizer 24 are detected. In other words, power P(1) of the measured light input to the polarizer 24 and power P(2) of the measured light output from the polarizer 24 are detected. Then, the state of the polarization controller 2 is adjusted so as to minimize a variable P represented by the following equation. Note that k is a constant equivalent to optical loss generated due to the configuration of the optical sampling circuit 1.

$$P=P(2)/k-P(1)$$

In order to realize the above control, in step S21, power P(1)0 of the measured light input to the polarizer 24 is detected by using the photo detector 42, and power P(2)0 of the measured light output from the polarizer 24 is detected by using the photo detector 45. In steps S23 and S32, power P(1)1 of the measured light input to the polarizer 24 and power P(2)1 of the measured light output from the polarizer 24 are detected. In addition, in steps S24 and S33, the variable P0 is compared with the variable P1. Note that the variable P0 and the variable P1 can be obtained by the following equations.

$$P0=P(2)0/k-P(1)0$$

$$P1=P(2)1/k-P(1)1$$

Figure 11:
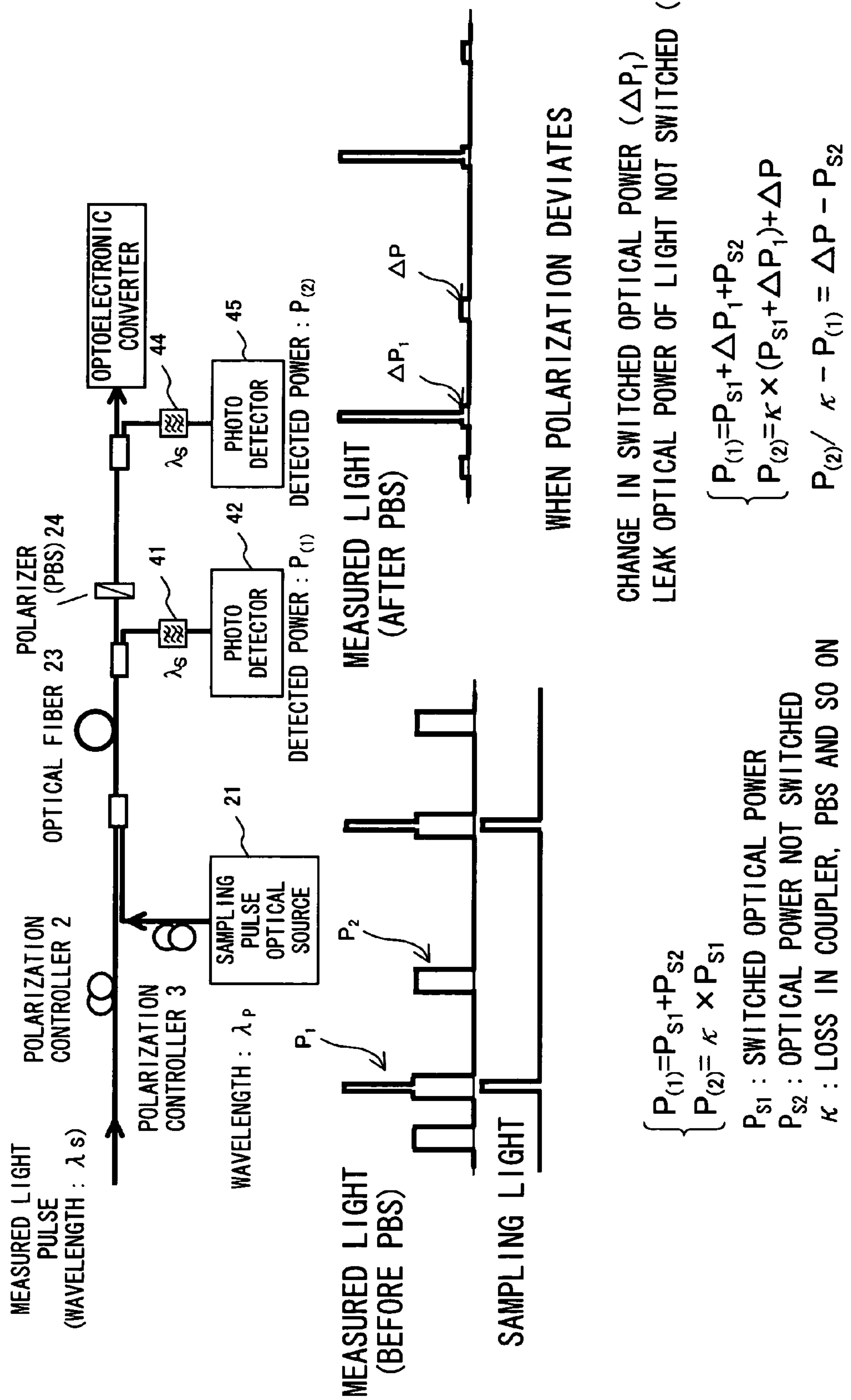
FIG. 11 is a diagram explaining a major part of the method for controlling the polarization state of the measured light.

By the above process, the variable P is minimized. In the following description, the reason that the polarization state of the measured light is optimized by minimizing the variable P is explained with reference to FIG. 11. Note that in the explanation of FIG. 11, the optical sampling pulse overlaps only a part of the optical pulse carried by the measured light in a time domain. Here, "a part of the optical pulse" can be a case referring it as the M optical pulses in N optical pulses (M<N), or a case referring it as a part of each optical pulse. In the model shown in FIG. 11, each of the optical power detected by the photo detector 42 and the photo detector 45 is assigned as "P(1)" and "P(2)", respectively.

Assume a state such that the polarization state of the measured light is optimized. Under such an optimized state, the average power of the measured light output from the optical fiber 23 in the presence of the optical sampling pulse is assigned to be "$P_s1$". The average power of the measured light output from the optical fiber 23 in the absence of the optical sampling pulse is assigned to be "$P_s2$". Then, the optical power P(1) detected by the photo detector 42 can be represented by the following equation.

$$P(1)=P_s1+P_s2$$

In the above optimized state, the power of the measured light output from the polarizer (PBS) 24 in the presence of the optical sampling pulse is "$k\times P_s1$". Here, k is a constant determined by the loss, which occurs when a prescribed polarization component is extracted in the polarizer 24 and the loss in the optical coupler for splitting the optical signal to the photo detector 45. On the other hand, the measured light, in the absence of the optical sampling pulse, is completely blocked by the polarizer 24. Consequently, in such a case, the optical power P(2) detected by the photo detector 45 can be represented by the following equation.

$$P(2)=k\times P_s1$$

Suppose the polarization state of the measured light is changed. In this case, the difference between the polarization direction of the measured light and that of the optical sampling pulse deviates from the optimal value, causing the change in the nonlinear effect (particularly, the gain of the optical parametric amplification) caused in the optical fiber 23. Here, the amount of change in the power of the measured light due to the change in the polarization state of the measured light in the presence of the optical sampling pulse is assigned to be "ΔP1". Then, the optical power P(1) detected by the photo detector 42 when the polarization state of the measured light changes can be represented by the following equation (a).

$$P(1)=P_s1+\Delta P1+P_s2 \quad (a)$$

When the polarization state of the measured light changes, the polarization direction of the measured light in the absence of the optical sampling pulse deviates from the direction orthogonal to the polarization main axis of the polarizer 24. For that reason, a part of the measured light leaks from the polarizer 24. Here, the optical power leaking from the polarizer 24 due to the change in the polarization state of the measured light in the absence of the optical sampling pulse is assigned to be "ΔP". Then, the optical power P(2) detected by the photo detector 45 when the polarization state of the measured light changes can be represented by the following equation (b).

$$P(2)=k\times(P_s1+\Delta P1)+\Delta P \quad (b)$$

From the equation (a) and the equation (b), the following equation (c) can be obtained.

$$P(2)/k-P(1)=\Delta P-P_s2 \quad (c)$$

As the polarization state of the measured light becomes closer to the optimal state, "ΔP" should be smaller. Minimization of "ΔP" is equivalent to the minimization of "P(2)/k−P(1)" in the above equation (c). Consequently, by controlling to minimize "P(2)/k−P(1)" corresponding to the variable P, it is possible to optimize the polarization state of the measured light.

As described above, the optical sampling circuit used in the optical waveform measurement apparatus of the present embodiment comprises a function for optimizing the polarization states of each of the measured light and the optical sampling pulse. The adjustment operation by this function can be conducted in parallel to the operation for observing or measuring the waveform of the measured light. For that reason, even if the characteristics of the optical fiber 23 changes during the operation of the optical waveform measurement apparatus due to temperature change etc., for example, it is possible to maintain the polarization states of the measured light and the optical sampling pulse in the optical state at all time. Therefore, the optical waveform measurement apparatus of the embodiment can always measure the waveform of the optical signal precisely. In addition, the optical waveform measurement apparatus of the present embodiment does not require a costly configuration like the one described in Non-Patent Document 1.

<Variation of Optical Sampling Circuit>

A highly nonlinear optical fiber to which germanium etc. is doped or a photonic crystal fiber etc., for example, can be used for the optical fiber 23. By using these optical fibers, stabilized characteristics even at the temperature change can be achieved. Instead of the optical fiber 23, other nonlinear optical medium can be used. For the other nonlinear optical medium, a photonic crystal can be used, for example.

As the polarization controllers 2 and 3, a wave-plate polarization controller having a λ/2 wave plate and a λ/4 wave plate is shown in the above embodiment; however, the polarization controller of the present invention is not limited to the above type. In other words, a variety of publicly known technologies can be employed as the polarization controllers 2 and 3. Other than the wave plate type, a $LiNbO_3$ polarization controller, a stress-type polarization controller, and a Faraday rotator etc. can be used for example. Among the above controllers, a stress-type polarization controller has fast response speed and is favorable for polarization controllers 2 and 3. An example of stress-type polarization controllers is, for example, "PolaRITE II" of General Photonics Corporation in the United States.

FIGS. 12-16 are diagrams showing variation s of the optical sampling circuit. The optical sampling circuit shown in FIG. 12 comprises the bandpass filter 25 in the previous stage of the optical splitter 43. A part of the optical signal output from the bandpass filter 25 (i.e. the measured light) is split by the optical splitter 43, and is guided to the photo detector 45. According to this configuration, the number of the optical filters (specifically, the bandpass filter 44) can be reduced compared with the configuration shown in FIG. 7.

Figure 13:
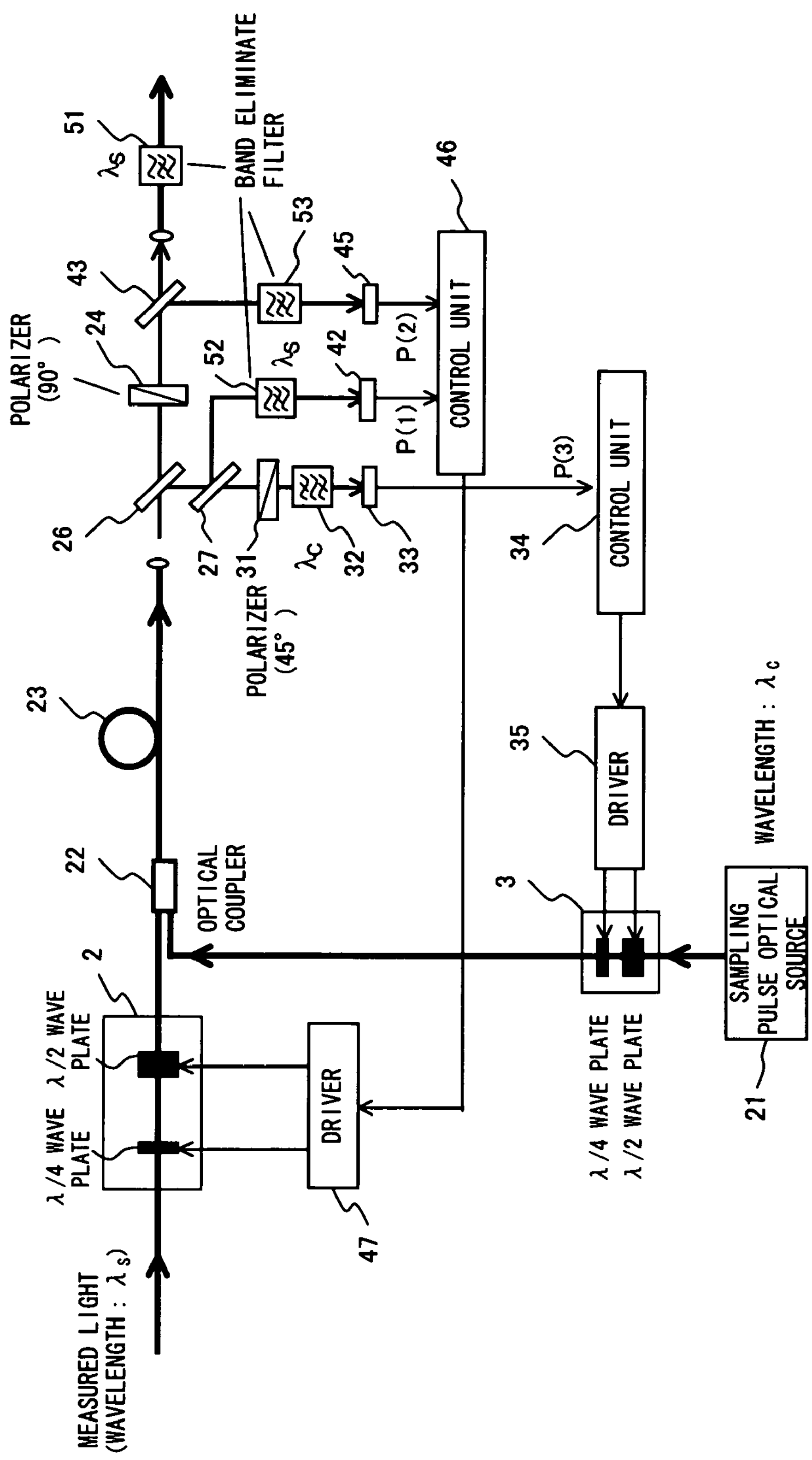

The optical sampling circuit shown in FIG. 13, instead of the bandpass filters 25, 41, and 44 shown in FIG. 7, comprises band eliminate filters 51, 52, and 53. Each of the band eliminate filters 51-53 eliminates the wavelength component $\lambda_c$ of the light carrying the optical sampling pulse; however, the filters do not eliminate the wavelength component $\lambda_s$ of the measured light. Therefore, the band eliminate filters 51, 52, and 53 substantially operate similarly to the bandpass filters 25, 41, and 44, respectively. According to this configuration, the selection degree of freedom of the wavelength of the measured light is enhanced. Note that the band eliminate filter can be realized by Fiber Bragg Gratings, for example.

The optical sampling circuit shown in FIG. 14 comprises a band eliminate filter 51 in the previous stage of the optical splitter 43. A part of the optical signal output from the band eliminate filter 51 is split by the optical splitter 43 and is guided to the photo detector 45. According to this configuration, the number of the optical filters (specifically, the band eliminate filter 53) can be reduced compared with the configuration shown in FIG. 13.

Figure 15:
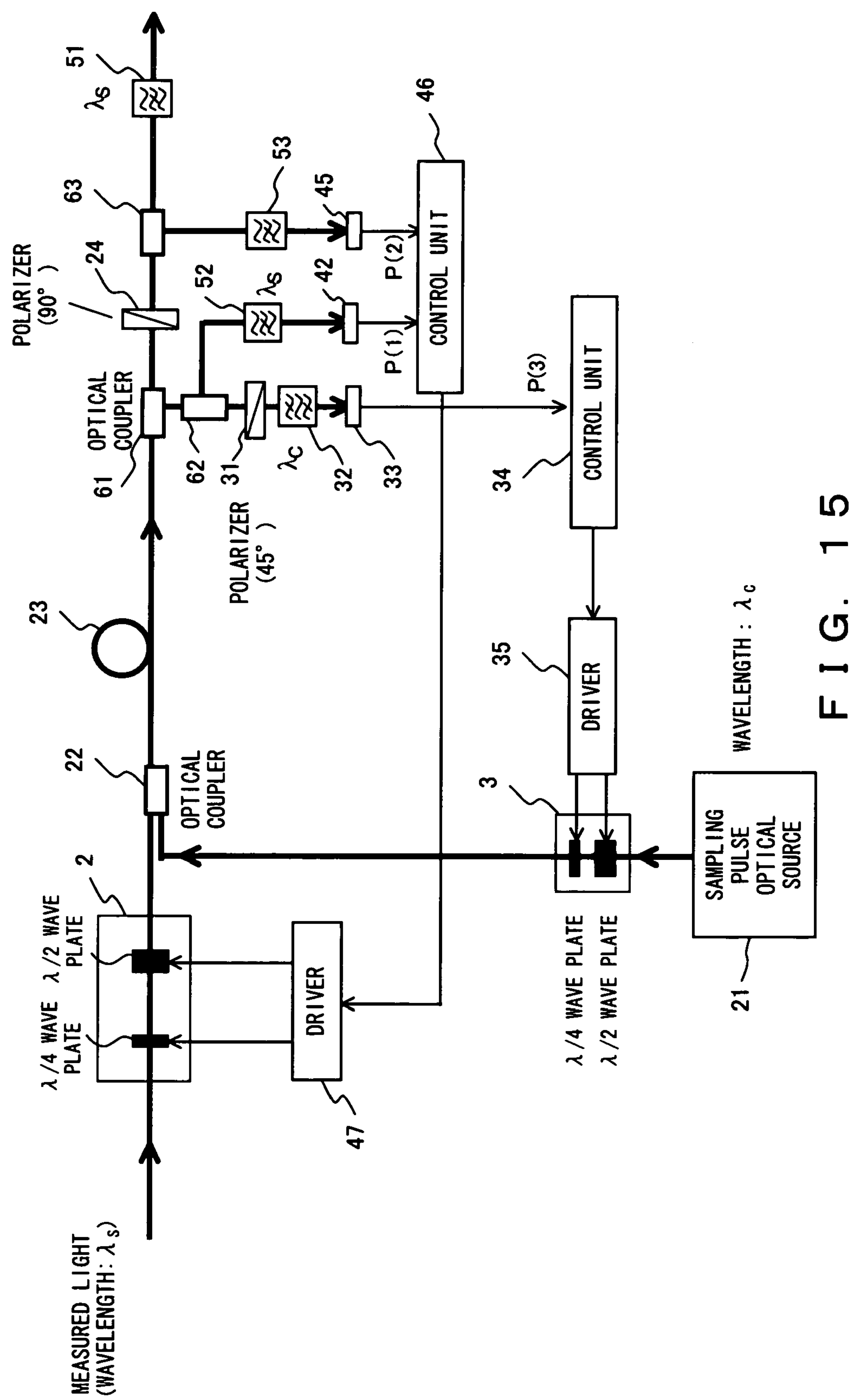

In the optical sampling circuit shown in FIG. 15, an optical path inputting an optical signal to the polarizer 24 and an optical path outputting the optical signal from the polarizer 24 are formed by an optical waveguide. Therefore the optical signal output from the optical fiber 23 is split by an optical coupler 61 and each split signal is guided to the polarizer 24 and an optical coupler 62. The optical coupler 62 splits the optical signal and each split signal is guided to the polarizer 31 and the band eliminate filter 52. The optical signal output from the polarizer 24 is split by the optical coupler 63 and each split signal is guided to the band eliminate filters 51 and 53. Introduction of this configuration improves the stability against the external vibration etc.

Figure 16:
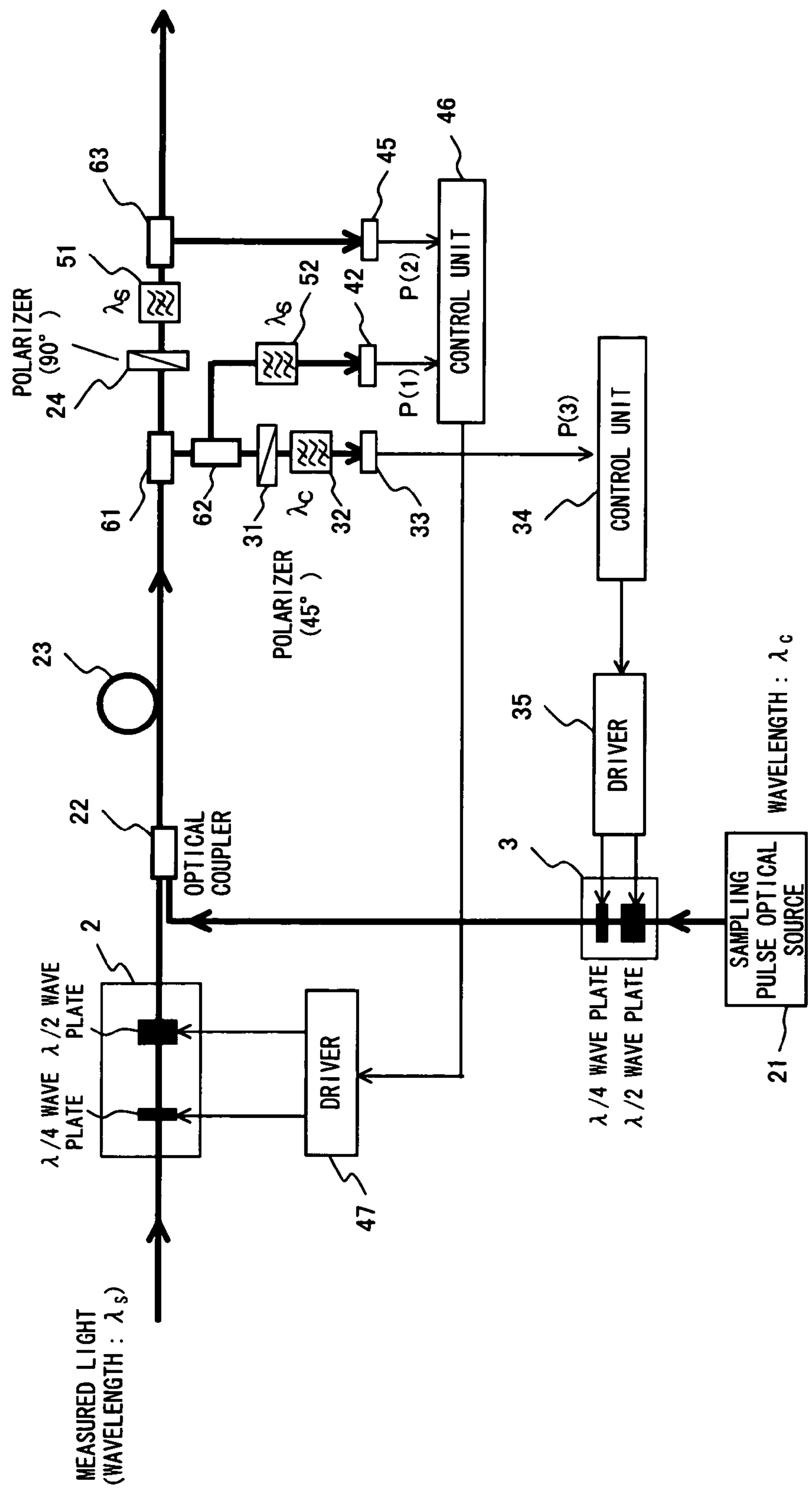

The optical sampling circuit shown in FIG. 16 comprises the band eliminate filter 51 in the previous stage of the optical coupler 63. A part of the optical signal output from the band eliminate filter 51 is split by the optical coupler 63, and is guided to the photo detector 45. According to this configuration, the number of the optical filters (specifically the band eliminate filter 53) can be reduced compared with the configuration shown in FIG. 15.

<Optical Transmission System>

FIG. 17 is a diagram describing the configuration of an optical transmission system 70 using the optical switch relating to the present invention. In FIG. 17, a transmitter 71 performs time-division-multiplexing of N optical signals and transmits the multiplexed signals. In this embodiment, the bit rate of each optical signal is assumed to be B/N (bps). Then, the bit rate of the multiplexed optical signal transmitted from the transmitter 71 is B (bps). The multiplexed signals are transmitted while being amplified by an optical amplifier provided in an optical transmission path.

An optical distributor 72 distributes the multiplexed optical signals received via the optical transmission path into a plurality of optical switches 1-1 through 1-N. The optical distributor 72 is not limited in particular; however, it can be realized, for example, by a 1:N optical coupler.

A clock recovery circuit 73 recovers a clock signal from the multiplexed optical signal. The frequency of the clock signal recovered by the clock recovery circuit 73 is B/N(Hz). The recovered clock signal is provided to each of the optical switch 1-1 through 1-N. Here, the timing of each clock signal being provided to the optical switch 1-1 through 1-N shifts 1/B seconds for each signal. It should be noted that the technique for recovering the clock signal from the input optical signal is known and is described, for example, in C. Boerner, et al., "320 *Gbit/s Clock Recovery with Electro-Optical PLL using a bidirectionally operated Electroabsorption Modulator as Phase Comparator*", OFC2005, Otu03.

Each of the optical switches 1-1 through 1-N is realized by the optical sampling circuit explained with reference to FIGS. 7-16. However, when the optical sampling circuit explained with reference to FIGS. 7-16 is used as each of the optical switches 1-1 through 1-N, the above multiplexed optical signal is input instead of the measured light. In addition, an optical clock signal synchronized with the clock signal generated by the clock recovery circuit 73 is used instead of the optical sampling pulse. Each of the optical signals output from the optical switches 1-1 through 1-N is received by receivers 74-1 through 74-N, respectively. By so doing, the N optical signals transmitted from the transmitter 71 are received by the receivers 74-1 through 74-N, respectively.

In the optical transmission system with the above configuration, the optical signal is separated by using the optical switch relating to the present invention. In this embodiment, the polarization state of the multiplexed optical signal and that of the optical clock signal are appropriately controlled at all time in the optical switch relating to the present invention. Consequently, the communication quality can be improved.

<Optical Waveform Measurement Apparatus (Optical Sampling Oscilloscope)>

The optical waveform measurement apparatus of the embodiment of the present invention is an optical sampling oscilloscope, and displays the waveform of the measured light sampled by the optical sampling circuit explained with reference to FIGS. 7-16. In the following description, brief explanation of the operation principle of the optical sampling oscilloscope is provided with reference to FIG. 18.

In the following description, it is assumed that the repetition frequency of the optical signal carried by the measured light is $f_0$. In such a case, the frequency of the optical sampling pulse to be prepared is "$f_0/N+\Delta f$". Here, "N" is an integer of 1 or larger, and it is "2" in the example of FIG. 18. "$\Delta f$" is a frequency substantially lower than "$f_0$". The measured light and the optical sampling pulse are input to the nonlinear optical medium of the optical sampling circuit explained above (the optical fiber 23 in the above. embodiment). Note that the pulse width of the optical sampling pulse is preferably narrower than the pulse width of the optical signal to be observed. The frequency of the optical sampling pulse to be prepared may be "$f_0/N-\Delta f$".

The optical sampling circuit performs sampling of the measured light in a time domain where the optical sampling pulse is present and outputs the sample. The optical signal output from the optical sampling circuit is converted into an electrical signal by the photo detector circuit. The electrical signal represents the power of the optical signal. In the example of FIG. 18, optical power values S1-S4 are obtained respectively corresponding to the optical sampling pulses SP1-SP4. Here, the frequency of the optical sampling pulse is slightly shifted from the frequency of the optical signal carried by the measured light (or 1/N of the frequency). As a result, the time change of the power of the optical signal can be detected.

The optical power values S1-S4 obtained in the above manner are displayed in a display device. By so doing, the waveform of the optical signal is displayed. Note that the evaluation of the quality of an optical waveform based on the waveform of the optical signal is publicly known technique, and various types of evaluation software are known widely.

FIG. 19 is a diagram showing a detailed configuration of the optical waveform measurement apparatus of the embodiment. The optical waveform measurement apparatus comprises the above optical sampling circuit. Note that this drawing shows the configuration of the optical sampling circuit 1 shown in FIG. 7; however, any of the above other optical sampling circuit can be used.

A clock recovery circuit 81 recovers a clock signal from the measured light. The frequency of the recovered clock signal is "$f_0$". An RF oscillator 82 generates an RF signal having a frequency $\Delta f$. A trigger circuit 83 generates a driving signal using the clock signal obtained by the clock recovery circuit 81 and the RF signal obtained by the RF oscillator 82. The sampling pulse optical source 21 generates the optical sampling pulse in accordance with the driving signal. Here, the frequency of the driving signal is "$f_0/N+\Delta f$". Consequently, the frequency of the generated optical sampling pulse is also "$f_0/N+\Delta f$".

The measured light sampled by the optical sampling circuit 1 is converted into the electrical signal by an optoelectronic converter 84. The output signal of the optoelectronic converter 84 is converted into digital data by an A/D converter 85. Here, the A/D converter 85 performs A/D conversion process in synchronization with the driving signal generated by the trigger circuit 83. The digital data obtained by the A/D converter 85 is provided to a waveform display device 86 as vertical axis data. Meanwhile, the RF signal output from the RF oscillator 82 is provided to the waveform display device 86 as horizontal data.

According to the above configuration, the waveform of the optical signal carried by the measured light is displayed in the waveform display device 86. At that time, an operation to optimize the polarization state of the measured light and that of the optical sampling pulse is executed at all time in parallel with the operation to display the waveform on the waveform display device 86. Therefore, the waveform of the measured light can be accurately measured at all time.

Figure 20:
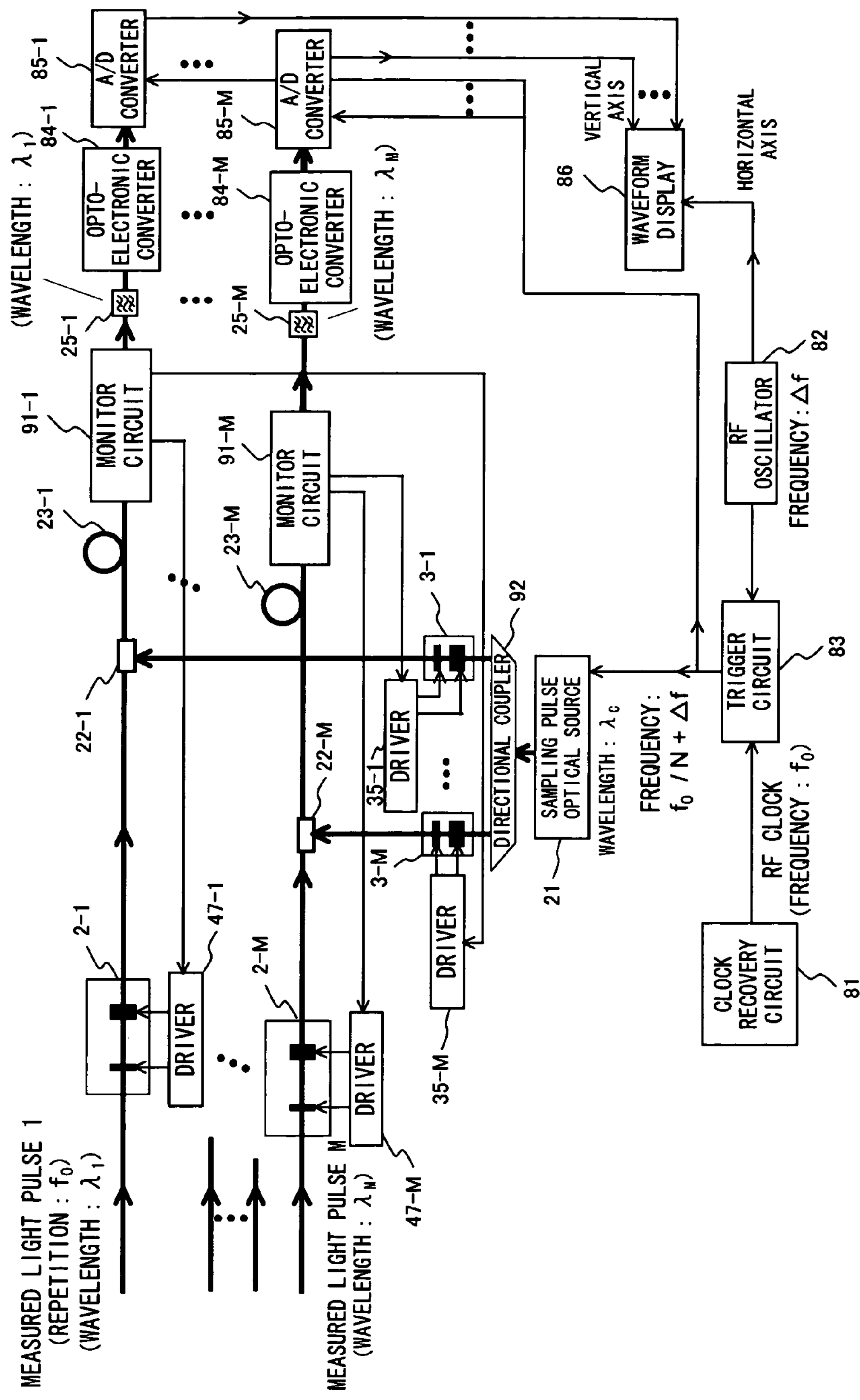
FIG. 20 is a diagram showing the configuration of the waveform measurement apparatus being able to measure waveforms of a plurality of the measured lights.

FIG. 20 is a diagram showing the configuration of the waveform measurement apparatus being able to measure waveforms of a plurality of the measured lights. Note that the repetition frequency $f_0$ of the optical pulse carried by each of the measured lights is the same for each other.

In order to measure the waveforms of a plurality of the measure lights, the optical waveform measurement apparatus comprises a plurality of polarization controllers 2-1 through 2-M and 3-1 through 3-M, a plurality of optical couplers 22-1 through 22-M, a plurality of optical fibers 23-1 through 23-M, a plurality of wavelength filters 25-1 through 25-M, a plurality of drivers 35-1 through 35-M and 47-1 through 47-M, a plurality of optoelectronic converters 84-1 through 84-M, a plurality of A/D converters 85-1 through 85-M, and a plurality of monitor circuits 91-1 through 91-M. Note that the sampling pulse optical source 21, the clock recovery circuit 81, the RF oscillator 82, and the waveform display device 86 are the same as described above. The directional coupler 92 directs the optical sampling pulse generated by the sampling pulse optical source 21 to the polarization controllers 3-1 through 3-M.

FIG. 21 is a diagram showing a configuration of the monitor circuit. In this drawing, the monitor circuits 91-*i* (i=1, 2, . . . , M) represents an arbitrary one of a plurality of monitor circuits 91-1 through 91-M. The monitor circuit 91-*i* comprises the polarizers 24 and 31, the optical splitters 26, 27, and 43, the bandpass filters 33, 41, and 44, the photo detectors 33, 42, and 45, and the control units 34 and 46. However, the optical signal output from the optical fiber 23-*i* is input to the monitor circuit 91-*i*. The bandpass filters 41 and 44 provided in the monitor circuit 91-*i* passes through the light having the wavelength $\lambda_i$. Additionally, the control signals generated by the control units 34 and 46 provided in the monitor circuit 91-*i* are respectively sent to the drivers 35-*i* and 47-*i*.

As described above, the optical waveform measurement apparatus shown in FIG. 20 is provided with a circuit for individually controlling the polarization states of each measured light.

Figure 22:
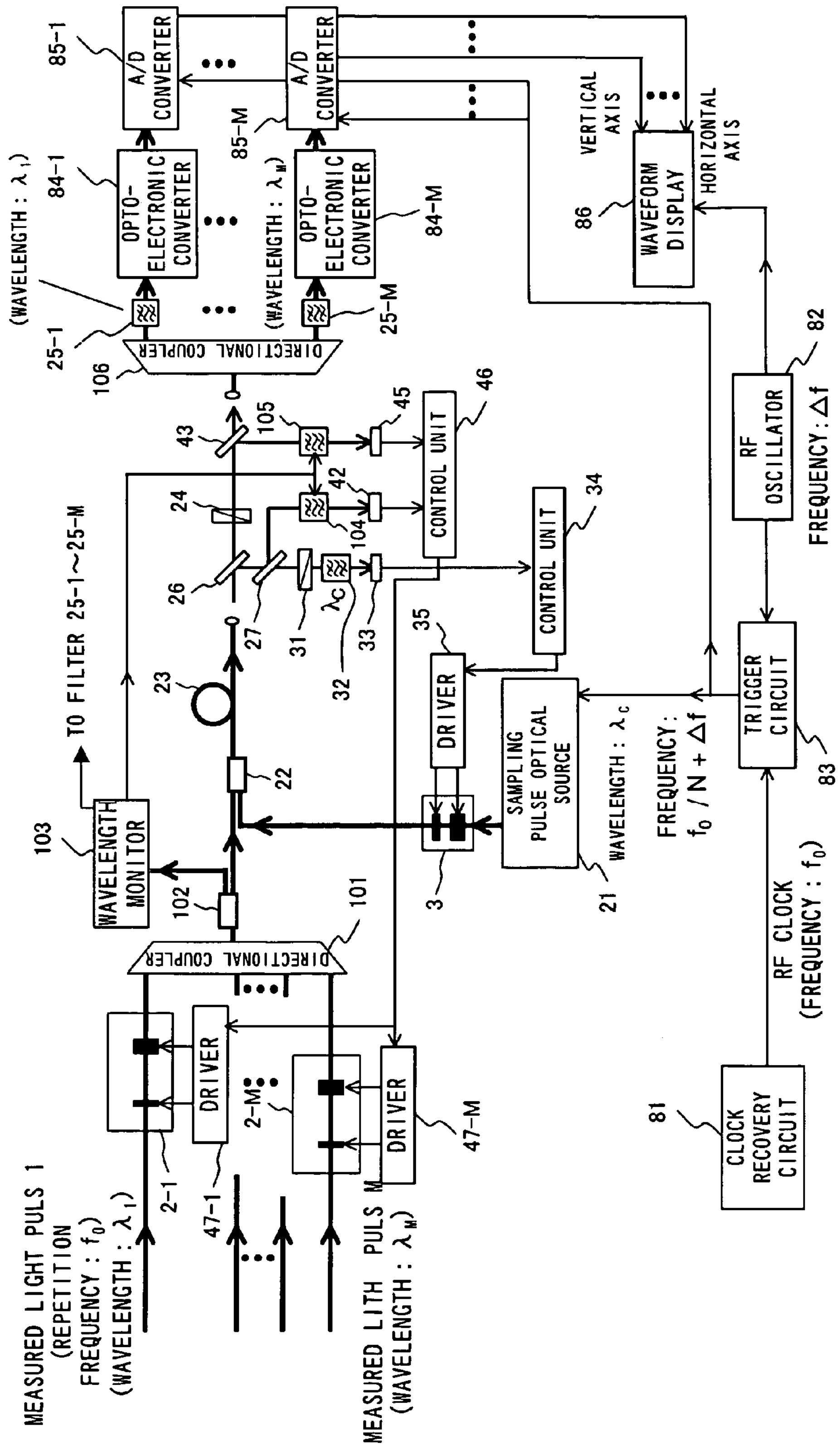
FIG. 22 is a diagram showing another configuration of the optical waveform measurement apparatus being able to measure waveforms of a plurality of measured lights.

FIG. 22 is a diagram showing another configuration of the optical waveform measurement apparatus being able to measure waveforms of a plurality of measured lights. The optical waveform measurement apparatus shown in FIG. 22 has a configuration in which the optical fibers 23-1 through 23-M and the monitor circuits 91-1 through 91-M of the optical waveform. measurement apparatus shown in FIG. 20 are shared. Here, the wavelengths of a plurality of the measured lights (λ1-λM) are different from one another.

A directional coupler 101 couples the output paths of the polarization controllers 2-1 through 2-M. An optical coupler 102 guides the optical signal output from the directional coupler 101 to the optical coupler 22, and splits a part of the optical signal to guide to a wavelength monitor unit 103. The wavelength monitor unit 103 detects the wavelength of the optical output of the directional coupler 101. Note that the wavelength detected by the wavelength monitor unit 103 is an arbitrary wavelength (λ1-λM) of a plurality of the measured lights. Wavelength variable filters 104 and 105 are provided instead of the above bandpass filters 41 and 44, and can selectively pass arbitrary wavelengths (λ1-λM). A directional coupler 106 guides the optical signal output from the polarizer 24 to the bandpass filters 25-1 through 25-M. The center wavelengths of the bandpass filters 25-1 through 25-M are variable, respectively. The center wavelength of the bandpass filters 25-1 through 25-M is set by the wavelength monitor unit 103 when the wavelength monitor unit 103 detects the wavelength $\lambda_i$.

When the measured optical pulse i (i=1, 2, . . . , M) is input to the optical waveform measurement apparatus with the above configuration, the wavelength monitor unit 103 notifies the wavelength variable filters 104 and 105 of the detection of the wavelength $\lambda_i$. The wavelength variable filters 104 and 105, upon reception of this notification, individually set the transmissive wavelength at "$\lambda_i$". The power of the optical signal output from the wavelength variable filters 104 and 105 is detected by the photo detectors 42 and 45. The control unit 46 executes the process in the flowchart shown in FIG. 10 by using the power value detected by the photo detectors 42 and 43. At that time, the control unit 46 controls the polarization state of the polarization controller 2-*i* via the driver 47-*i*.

The above control can be realized by the following order, for example. That is, the control unit 46 generates a wavelength control signal designating the measured light, the polarization state of which is to be controlled. The wavelength control signal in this case is a signal cyclically designating the wavelength λ1-λM one by one. The wavelength control signal is sent to the wavelength monitor unit 103. The wavelength monitor unit 103 monitors the optical power of the designated wavelength, and, if the power is larger than a threshold, determines that the corresponding measured light is input. Afterwards, the determination is notified to the wavelength variable filters 104 and 105. The operations following to the above operations are the same as the described above. Introduction of this sequence allows the sequential optimization of the polarization state of a plurality of the measured lights while continuing the waveform measurement operations.

What is claimed is:

1. An optical waveform measurement apparatus, comprising:

a first polarization controller for controlling a polarization state of measured light;

a second polarization controller for controlling a polarization state of an optical sampling pulse for sampling the measured light;

a nonlinear optical medium, to which the measured light having the polarization state controlled by said first polarization controller and the optical sampling pulse having the polarization state controlled by said second polarization controller, are input;

an extraction unit for extracting a prescribed linear polarization component from an optical signal output from said nonlinear optical medium;

a first adjustment unit for adjusting said first polarization controller, based on an optical signal output from said nonlinear optical medium being tapped before said extraction unit and an optical signal output from said extraction unit, so that a polarization direction of the measured light has a first angle with respect to a polarization component extraction axis of said extraction unit; and a second adjustment unit for adjusting said second polarization controller, based on an optical signal output from said nonlinear optical medium being tapped before said extraction unit, so that a polarization direction of the optical sampling pulse has a second angle with respect to a polarization component extraction axis of said extraction unit, wherein the optical signal output from said extraction unit is used for waveform measurement of the measured light.

2. The optical waveform measurement apparatus according to claim 1, wherein said first adjustment unit adjusts said first polarization controller so that the polarization direction of the measured light is approximately orthogonal with respect to the polarization component extraction axis of said extraction unit, and said second adjustment unit adjusts said second polarization controller so that the polarization direction of the measured light and the polarization direction of the optical sampling pulse are different from each other by 40-50 degrees.

3. The optical waveform measurement apparatus according to claim 1, wherein said first adjustment unit adjusts said first polarization controller so that the polarization direction of the measured light is approximately orthogonal with respect to the polarization component extraction axis of said extraction unit; and said second adjustment unit adjusts said second polarization controller so that the polarization direction of the optical sampling pulse is rotated by 40-50 degrees from the polarization component extraction axis of said extraction unit.

4. The optical waveform measurement apparatus according to claim 3, wherein said second adjustment unit comprises:

a polarizer, which has a polarization component extraction axis in a direction of approximately 45 degrees with respect to the polarization component extraction axis of said extraction unit, for extracting the linear polarization component from the optical signal output from said nonlinear optical medium;

an optical filter, provided at an input side or an output side of the polarizer, for transmitting a wavelength component of the optical sampling pulse; and a processing unit for adjusting said second polarization controller so that power of the optical output from said optical filter is minimized.

5. The optical waveform measurement apparatus according to claim 3, wherein said first adjustment unit comprises:

a first monitoring light generation unit for generating first monitoring light by extracting a wavelength component of the measured light from an optical signal output from said nonlinear optical medium;

a second monitoring light generation unit for generating second monitoring light by extracting a wavelength component of the measured light from the optical signal output from said extraction unit; and a processing unit for adjusting said first polarization controller based on power of the first and second monitoring light.

6. The optical waveform measurement apparatus according to claim 5, wherein said extraction unit comprises an optical filter extracting a wavelength component of the measured light, and the second monitoring light is obtained by splitting the optical output of the optical filter.

7. The optical waveform measurement apparatus according to claim 3, wherein said first adjustment unit comprises:

a first monitoring light generation unit for generating first monitoring light by eliminating a wavelength component of the optical sampling pulse from the optical signal output from said nonlinear optical medium;

a second monitoring light generation unit for generating second monitoring light by eliminating a wavelength component of the optical sampling pulse from an optical signal output from said extraction unit; and a processing unit for adjusting said first polarization controller based on power of the first and second monitoring light.

8. The optical waveform measurement apparatus according to claim 7, wherein said extraction unit comprises an optical filter for eliminating the wavelength component of the optical sampling pulse, and the second monitoring light is obtained by splitting the optical output of the optical filter.

9. The optical waveform measurement apparatus according to claim 5, wherein said processing unit adjusts said first polarization controller so as to minimize "P2/k−P1" (where P1 represents power of the first monitoring light, P2 represents power of the second monitoring light, and k represents a prescribed constant).

10. The optical waveform measurement apparatus according to claim 1, wherein an optical input path and an optical output path of said extraction unit are realized by free-space transmission.

11. The optical waveform measurement apparatus according to claim 1, wherein an optical input path and an optical output path of said extraction unit are realized by an optical waveguide.

12. The optical waveform measurement apparatus according to claim 1, comprising:

a sampling pulse optical source for outputting an optical pulse having a sampling frequency obtained by adding or subtracting a prescribed shift frequency to or from a frequency one-Nth (where N is an integer including 1) of a repetition frequency of an optical signal carried by the measured light;

an optical filter for extraction a wavelength component of the measured light from optical output of said extraction unit;

a photo detector circuit for converting optical output of said optical filter to an electrical signal; and a display device for displaying an output signal of said photo detector circuit by using the shift frequency.

13. An optical waveform measurement apparatus, comprising:

a plurality of first polarization controllers, each controlling a polarization state of a plurality of measured lights having different wavelengths;

a plurality of second polarization controllers, each controlling a polarization state of a plurality of optical sampling pulses for sampling a plurality of the measurement light;

a plurality of nonlinear optical mediums, to which measured light having the polarization state controlled by a corresponding first polarization controller and an optical sampling pulse having a polarization state controlled by a corresponding second polarization controller are input;

a plurality of extraction units for extracting a prescribed linear polarization component from each of a plurality of optical signals output from said plurality of nonlinear optical medium;

a plurality of first adjustment units for adjusting a corresponding first polarization controller, based on an optical signal output from a corresponding nonlinear optical medium being tapped before a corresponding extraction unit and an optical signal output from the corresponding extraction unit, so that a polarization direction of the measured light has a first angle with respect to a polarization component extraction axis of the corresponding extraction unit;

a plurality of second adjustment unit for adjusting a corresponding second polarization controller, based on an optical signal output from a corresponding nonlinear optical medium being tapped before a corresponding extraction unit, so that a polarization direction of the optical sampling pulse has a second angel with respect to a polarization component extraction axis of the corresponding extraction unit;

a sampling pulse optical source for outputting an optical pulse having a sampling frequency obtained by adding or subtracting a prescribed shift frequency to or from a frequency one-Nth (where N is an integer including 1) of a repetition frequency of an optical signal carried by the measured light;

a plurality of optical filters for extracting a wavelength component of the corresponding measured light from optical output of said plurality of extraction units;

a plurality of photo detector circuits for converting optical output of said plurality of optical filters to an electrical signal; and a display device for displaying an output signal of said plurality of photo detector circuits by using the shift frequency.

14. An optical waveform measurement apparatus, comprising:

a plurality of first polarization controllers, each controlling a polarization state of a plurality of measured lights having different wavelengths;

an optical coupler for coupling output paths of said plurality of first polarization controllers;

a second polarization controller for controlling a polarization state of an optical sampling pulse for sampling a plurality of the measurement light;

a nonlinear optical medium, to which the measured light output from said optical coupler and the optical sampling pulse having a polarization state controlled by said second polarization controller are input;

an extraction unit for extracting a prescribed linear polarization component from an optical signal output from said nonlinear optical medium;

a wavelength monitoring unit for monitoring a wavelength of the measured light output from said optical coupler;

a first adjustment unit for adjusting said first polarization controller corresponding to a monitoring result of said wavelength monitoring unit, based on an optical signal output from said nonlinear optical medium being tapped before said extraction unit and an optical signal output from said extraction unit, so that a polarization direction of the measured light has a first angle with respect to a polarization component extraction axis of said extraction unit;

a second adjustment unit for adjusting said second polarization controller, based on an optical signal output from said nonlinear optical medium being tapped before said extraction unit, so that a polarization direction of the optical sampling pulse has a second angle with respect to a polarization component extraction axis of said extraction unit;

a sampling pulse optical source for outputting an optical pulse having a sampling frequency obtained by adding or subtracting a prescribed shift frequency to or from a frequency one-Nth (where N is an integer including 1) of a repetition frequency of an optical signal carried by the measured light as the sampling pulse;

a plurality of optical filters for extracting a wavelength component of the corresponding measured light from optical output of said extraction unit;

a plurality of photo detector circuits for converting optical outputs of said plurality of optical filters to electrical signals; and a display device for displaying an output signal of said plurality of photo detector circuits by using the shift frequency.

15. A method for measuring a waveform of measured light by an optical waveform measurement apparatus which comprises a first polarization controller for controlling a polarization state of the measured light, a second polarization controller for controlling a polarization state of an optical sampling pulse for sampling the measured light, a nonlinear optical medium, to which the measured light having the polarization state controlled by the first polarization controller and the optical sampling pulse having the polarization state controlled by the second polarization controller are input, and an extraction unit for extracting a prescribed linear polarization component from an optical signal output from the nonlinear optical medium, comprising:

adjusting the first polarization controller, based on an optical signal output from the nonlinear optical medium being tapped before the extraction unit and an optical signal output from the extraction unit, so that a polarization direction of the measured light has a first angle with respect to a polarization component extraction axis of the extraction unit; and adjusting the second polarization controller, based on an optical signal output from the nonlinear optical medium being tapped before said extraction unit, so that a polarization direction of the optical sampling pulse has a second angle with respect to a polarization component extraction axis of the extraction unit, wherein the adjusting steps are performed in parallel with the operation for measuring a waveform of the measured light by using an optical signal output from the extraction unit.

16. An optical transmission system for transmitting a multiplexed optical signal, in which a plurality of optical signals are time-division multiplexed, comprising:

a plurality of optical switches;

an optical distributor for distributing the multiplexed optical signal into said plurality of optical switches;

a clock recovery circuit for recovering a clock signal from the multiplexed optical signal and for supplying the clock signal to said plurality of optical switches;

a plurality of receivers for receiving an optical signal output from said plurality of the optical switches, respectively, wherein each of said optical switches comprises:

a first polarization controller for controlling a polarization state of an optical signal provided from said optical distributor;

a second polarization controller for controlling a polarization state of an optical pulse generated by using the clock signal;

a nonlinear optical medium, to which the optical signal having the polarization state controlled by said first polarization controller and the optical pulse having the polarization state controlled by said second polarization controller are input;

an extraction unit for extracting a prescribed linear polarization component from an optical signal output from said nonlinear optical medium;

a first adjustment unit for adjusting said first polarization controller, based on an optical signal output from said nonlinear optical medium being tapped before said extraction unit and an optical signal output from said extraction unit, so that a polarization direction of the optical signal from said optical distributor has a first angle with respect to a polarization component extraction axis of said extraction unit; and a second adjustment unit for adjusting said second polarization controller, based on an optical signal output from said nonlinear optical medium being tapped before said extraction unit, so that a polarization direction of the optical pulse has a second angle with respect to a polarization component extraction axis of said extraction unit.

* * * * *

UNITED STATES PATENT AND TRADEMARK OFFICE

CERTIFICATE OF CORRECTION

PATENT NO. : 7,518,711 B2
APPLICATION NO. : 11/477538
DATED : April 14, 2009
INVENTOR(S) : Fumio Futami et al.

It is certified that error appears in the above-identified patent and that said Letters Patent is hereby corrected as shown below:

Column 18, Line 48 claim 13, change “angel” to --angle--.

Signed and Sealed this

Thirtieth Day of June, 2009

JOHN DOLL

*Acting Director of the United States Patent and Trademark Office*